United States Patent
Choi

(10) Patent No.: US 10,241,240 B1
(45) Date of Patent: Mar. 26, 2019

(54) LENS ASSEMBLY AND CAMERA MODULE INCLUDING THE LENS ASSEMBLY

(71) Applicant: LG INNOTEK CO., LTD., Seoul (KR)

(72) Inventor: Yong Bok Choi, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 15/896,671

(22) Filed: Feb. 14, 2018

Related U.S. Application Data

(63) Continuation of application No. PCT/KR2018/001846, filed on Feb. 12, 2018.

(30) Foreign Application Priority Data

Dec. 6, 2017  (KR) .................. 10-2017-0166514
Dec. 14, 2017  (KR) .................. 10-2017-0172664

(51) Int. Cl.
  *G02B 3/14* (2006.01)
  *G03B 17/26* (2006.01)
  *G02B 27/64* (2006.01)
  *G03B 13/36* (2006.01)
  *G03B 17/56* (2006.01)

(52) U.S. Cl.
  CPC ............ *G02B 3/14* (2013.01); *G02B 27/646* (2013.01); *G03B 13/36* (2013.01); *G03B 17/26* (2013.01); *G03B 17/566* (2013.01)

(58) Field of Classification Search
  CPC .................................................. H04N 5/335
  USPC ......................................................... 348/374
  See application file for complete search history.

(56) References Cited

U.S. PATENT DOCUMENTS

| 8,159,754 | B2 |   | 4/2012 | Takai et al. |
| 9,052,451 | B2 | * | 6/2015 | Tsai ................... G02B 26/004 |
| 2008/0049807 | A1 | * | 2/2008 | Fujino .................... B41J 2/471 372/50.23 |
| 2010/0073534 | A1 | * | 3/2010 | Yano ................ B29D 11/00432 348/294 |

FOREIGN PATENT DOCUMENTS

| JP | 2008-203587 A | 9/2008 |
| KR | 10-2007-0008169 A | 1/2007 |
| KR | 10-1805128 B1 | 12/2017 |

OTHER PUBLICATIONS

Office Action dated Apr. 19, 2018 in Korean Application No. 10-2017-0172664.

* cited by examiner

Primary Examiner — Joel W Fosselman
(74) Attorney, Agent, or Firm — Saliwanchik, Lloyd & Eisenschenk

(57) ABSTRACT

A lens assembly according to an embodiment includes a holder including a first sidewall having a first opening and a second sidewall having a second opening, a liquid lens unit including at least a portion disposed in the first opening and the second opening, and an adhesive member coupling the holder and the liquid lens unit, wherein the second opening faces the first opening in a direction perpendicular to an optical-axis of the liquid lens unit.

20 Claims, 22 Drawing Sheets

LENS ASSEMBLY AND CAMERA MODULE INCLUDING THE LENS ASSEMBLY

CROSS-REFERENCE TO RELATED APPLICATIONS

This application is a continuation of International Patent Application No. PCT/KR2018/001846, filed Feb. 12, 2018, which claims priority to Korean Application Nos. 10-2017-0166514, filed Dec. 6, 2017; and 10-2017-0172664, filed Dec. 14, 2017, the disclosures of each of which are incorporated herein by reference in their entirety.

TECHNICAL FIELD

Embodiments relate to a lens assembly and a camera module including the lens assembly.

BACKGROUND ART

Users of portable devices desire optical devices that are compact, exhibit high resolution, and have a variety of photographing functions. For example, the photographing functions may include an optical zoom-in/zoom-out function, an auto-focusing (AF) function, a handshaking absorbing function, or an optical image stabilization (OIS) function.

In order to realize the various photographing functions described above, the conventional method has been to combine several lenses and directly move the combined lenses. However, the size of an optical device may increase when the number of lenses is increased as described above.

Auto-focusing and handshaking absorbing functions are implemented by moving or tilting several lenses, which are fixed to a lens holder and aligned with the optical axis, along the optical axis, or in a direction perpendicular to the optical axis. To this end, a separate lens-driving device is required to drive a lens assembly, which is configured with a plurality of lenses. However, the lens-driving device exhibits high power consumption, and a glass cover needs to be separately added to a camera module in order to protect the lens-driving device, thus causing an increase in the overall size of a conventional camera module. Therefore, to solve this, studies have been conducted on a liquid lens unit, which performs auto-focusing and handshaking absorbing functions by electrically adjusting the curvature of an interface of two types of liquids.

DISCLOSURE

Technical Problem

Therefore, embodiments of the subject invention provide a lens assembly in which a liquid lens unit is stably fixed to a holder and which may be protected from foreign substances, and a camera module including the lens assembly.

The embodiments are not limited to the aforementioned devices, and other unmentioned devices should be clearly understood by those of ordinary skill in the art from the following description.

Technical Solution

In accordance with one embodiment, a lens assembly may include a holder including a first sidewall having a first opening and a second sidewall having a second opening, a liquid lens unit including at least a portion disposed in the first opening and the second opening, and an adhesive member coupling the holder and the liquid lens unit, wherein the second opening faces the first opening in a first direction perpendicular to an optical-axis of the liquid lens unit.

In accordance with another embodiment, a lens assembly may include a holder including a first opening and a second opening, a liquid lens unit including a portion protruding through at least one of the first opening or the second opening, and an adhesive member coupling the holder and the liquid lens unit, wherein the adhesive member includes a first adhesive coupling the holder and an upper surface of the liquid lens unit and a second adhesive coupling the holder and a lower surface and a side surface of the liquid lens unit, and wherein the second opening faces the first opening in a first direction perpendicular to an optical-axis of the liquid lens unit.

In accordance with still another embodiment, a lens assembly may include a holder including a first opening and a second opening, a liquid lens unit disposed between the first opening and the second opening and protruding out of the first opening, a first adhesive fixing the liquid lens unit to the holder, and a second adhesive hermetically sealing the first opening, wherein the first adhesive and the second adhesive are formed of different materials, and wherein the second opening faces the first opening in a first direction perpendicular to an optical-axis of the liquid lens unit.

For example, the holder may further include a holder upper area disposed above the liquid lens unit and a holder lower area disposed below the liquid lens unit, the liquid lens unit may include a first area disposed outside the holder, and the adhesive member may be coupled to the first area of the liquid lens unit.

For example, the adhesive member may include a first adhesive coupling the holder upper area and the liquid lens unit, and a second adhesive coupling the holder lower area and the liquid lens unit.

For example, the first adhesive may have an I-shaped form, and the second adhesive may have a U-shaped form.

For example, the adhesive member may seal the holder to inhibit a foreign substance from being introduced inside the holder through the first opening from an outside.

For example, the first adhesive may have a maximum diameter smaller than a maximum diameter of the second adhesive.

For example, the second adhesive may be connected to the first adhesive.

For example, the second adhesive may have a contraction rate smaller than a contraction rate of the first adhesive.

For example, the second adhesive may include an adhesive having a contraction rate equal to or less than 1% upon curing.

For example, the second adhesive may include a silicon-based adhesive.

For example, the liquid lens unit may include a first area disposed outside of the first opening of the holder, and a second area disposed outside of the second opening of the holder, and the adhesive member may include a first adhesive disposed in the first area of the liquid lens unit and disposed on an upper portion of the liquid lens unit, a second adhesive disposed in the first area of the liquid lens unit and disposed on a lower portion and a side portion of the liquid lens unit, a third adhesive disposed in the second area of the liquid lens unit and disposed on the upper portion of the liquid lens unit, and a fourth adhesive disposed in the second area of the liquid lens unit and disposed on the lower portion and the side portion of the liquid lens unit.

For example, the liquid lens unit may include a liquid lens, and a spacer disposed surrounding a lateral surface of the liquid lens.

For example, the liquid lens unit may further include a first connection substrate disposed above the liquid lens, and a second connection substrate disposed below the liquid lens, and the spacer may be disposed between the first connection substrate and the second connection substrate.

For example, at least a portion of the spacer may be disposed in the first opening and the second opening.

For example, the spacer may protrude outward from the holder through the first opening and the second opening.

For example, the liquid lens may include at least a portion disposed in the first opening and the second opening.

In accordance with a further embodiment, a camera module may include a main board and the lens assembly, the lens assembly being disposed on the main board, wherein the lens assembly may include a first lens unit disposed in the holder and a second lens unit disposed in the holder, and the liquid lens unit is disposed between the first lens unit and the second lens unit.

For example, the camera module may further include a cover disposed so as to surround the holder, the liquid lens unit, and the adhesive member, and the holder may include an upper surface in direct physical contact with the cover and located higher than an upper surface of the adhesive member.

For example, the camera module may further include a circuit element disposed on the main board so as to be spaced apart from the holder, and a circuit cover disposed so as to cover the circuit element.

Advantageous Effects

A lens assembly according to the embodiments may have improved optical performance due to easy positional adjustment of a liquid lens unit.

In the lens assembly according to the embodiments, a liquid lens unit may be stably fixed or coupled to a holder using an adhesive member.

A camera module including the lens assembly according to the embodiments may provide excellent optical performance, may have a reduced defective proportion, since the holder is sealed using the adhesive member so as to inhibit foreign substances from being introduced into the holder through an opening in the holder. In addition, the camera module may enable obviation of a filter and a sensor base, may reduce or solve a ghost or flare phenomenon, and may have a small thickness, which may reduce manufacturing costs and simplify the manufacturing process.

In addition, the effects acquired by the embodiments are not limited to the effects mentioned above, and other unmentioned effects should be clearly understood by those of ordinary skill in the art from the following description.

DESCRIPTION OF DRAWINGS

FIG. 3b is an enlarged view illustrating another embodiment of portion "K" of FIG. 3a.

FIGS. 4a to 4d are views for describing a holder, a liquid lens unit, a first adhesive member, a second adhesive member, and a third adhesive member as illustrated in FIGS. 2 and 3a.

FIGS. 5a and 5b are cross-sectional views illustrating embodiments of a lower member as illustrated in FIG. 3a.

BEST MODE

Figure 1:
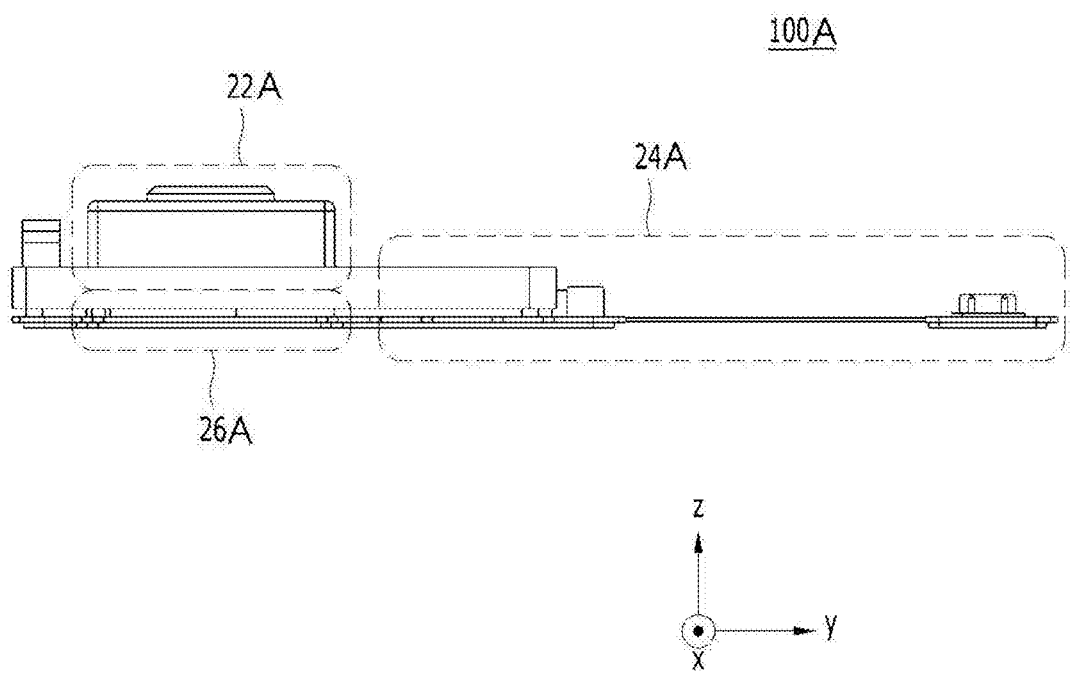
FIG. 1 is a schematic side view of a camera module according to an embodiment.

Hereinafter, exemplary embodiments are described in detail with reference to the accompanying drawings. The embodiments may be modified in various ways and may have various forms, and specific embodiments are illustrated in the drawings and are described in detail herein. However, this is not intended to limit the embodiments to the specific embodiments, and the embodiment should be understood as including all modifications, equivalents, and replacements that fall within the sprit and technical scope of the embodiments.

Although the terms "first" and "second" and the like may be used to describe various elements, the embodiments should not be limited by the terms. These terms are used for distinguishing between similar elements. In addition, terms, which are specially defined in consideration of the configurations and operations of the embodiments, are given only to explain the embodiments, and do not limit the scope of the embodiments.

In the following description of the embodiments, it should be understood that, when each element is referred to as being formed "on" or "under" the other element, it can be directly "on" or "under" the other element or be indirectly formed with one or more intervening elements therebetween. In addition, it should also be understood that "on" or "under" the element may mean an upward direction and a downward direction of the element.

In addition, the relative terms "top/upper/above", "bottom/lower/under" and the like in the description and in the claims may be used to distinguish between any one substance or element and other substances or elements and not necessarily for describing any physical or logical relationship between the substances or elements or a particular order.

Hereinafter, a lens assembly and a camera module including the same according to embodiments are described using the Cartesian coordinate system, but the embodiments are not limited thereto. That is, with the Cartesian coordinate system, the x-axis, the y-axis and the z-axis may be orthogonal to one another, but the embodiments are not limited thereto. That is, the x-axis, the y-axis and the z-axis may cross one another.

Hereinafter, a camera module 100A according to an embodiment is described below with reference to FIGS. 1 to 5b.

FIG. 1 is a schematic side view of a camera module 100A according to an embodiment.

Referring to FIG. 1, the camera module 100A may include a lens assembly 22A, a control circuit 24A, and an image sensor 26A.

First, the lens assembly 22A may include a plurality of lens units and a holder in which the lens units are accommodated. As described below, the lens units may include a liquid lens, and may further include a first lens unit or a second lens unit. The lens units may include first and second lens units and a liquid lens unit.

The control circuit 24A serves to supply a drive voltage (or an operation voltage) to the liquid lens unit.

The control unit 24A described above and the image sensor 26A may be disposed on a single printed circuit board (PCB), but this is merely given by way of example, and the scope of the embodiment is not limited thereto.

When the camera module 100A according to the embodiment is applied to an optical device, the configuration of the control circuit 24A may be designed in different ways according to the specifications required in the optical device. In particular, the control circuit 24A may be implemented in a single chip, in order to reduce the magnitude of a drive voltage applied to the lens assembly 22A. Thereby, the size of an optical device, which is mounted in a portable device, may be further reduced.

Figure 2:
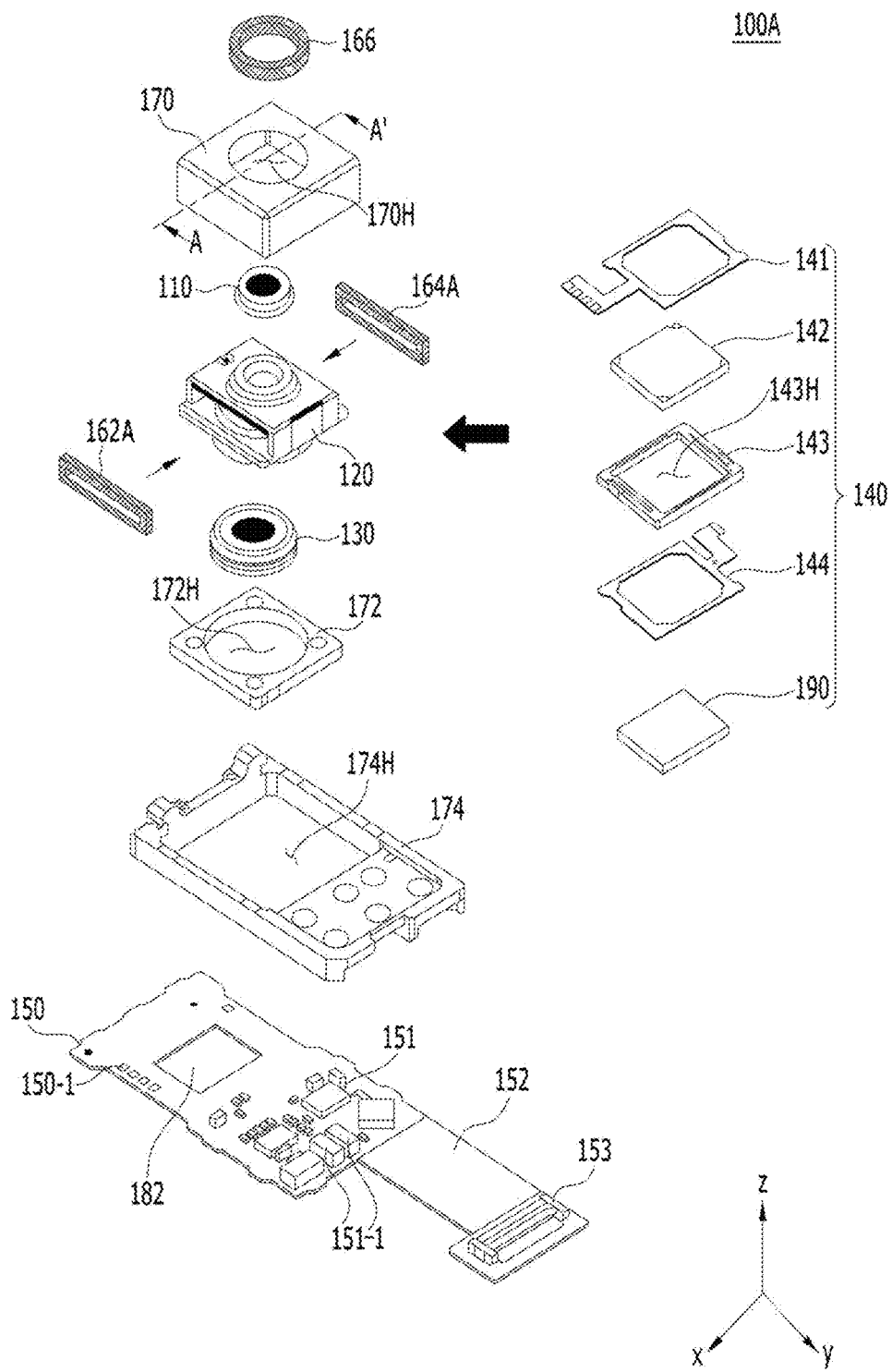
FIG. 2 is an exploded perspective view of the camera module illustrated in FIG. 1 according to an embodiment.

FIG. 2 is an exploded perspective view of the camera module 100A illustrated in FIG. 1 according to an embodiment.

Referring to FIG. 2, the camera module 100A may include a lens assembly, a main board 150, and an image sensor 182. In addition, the camera module 100A may further include a first cover 170 and a middle base 172. In addition, the camera module 100A may further include at least one adhesive member and a second cover 174. The at least one adhesive member serves to couple or fix a liquid lens unit 140 to a holder 120. In the case of FIG. 2, the at least one adhesive member is exemplified as including all of a first adhesive member 162A, a second adhesive member 164A, and a third adhesive member 166, but the embodiment is not limited thereto. That is, according to another embodiment, the at least one adhesive member may include some of the first adhesive member 162A, some of the second adhesive member 164A, and some of the third adhesive member 166.

According to the embodiment, at least one of the components 110 to 190 of the camera module 100A illustrated in FIG. 2 may be omitted. Alternatively, at least one additional component, which is different from the components 110 to 190 illustrated in FIG. 2, may be included in the camera module 100A.

Figure 3A:
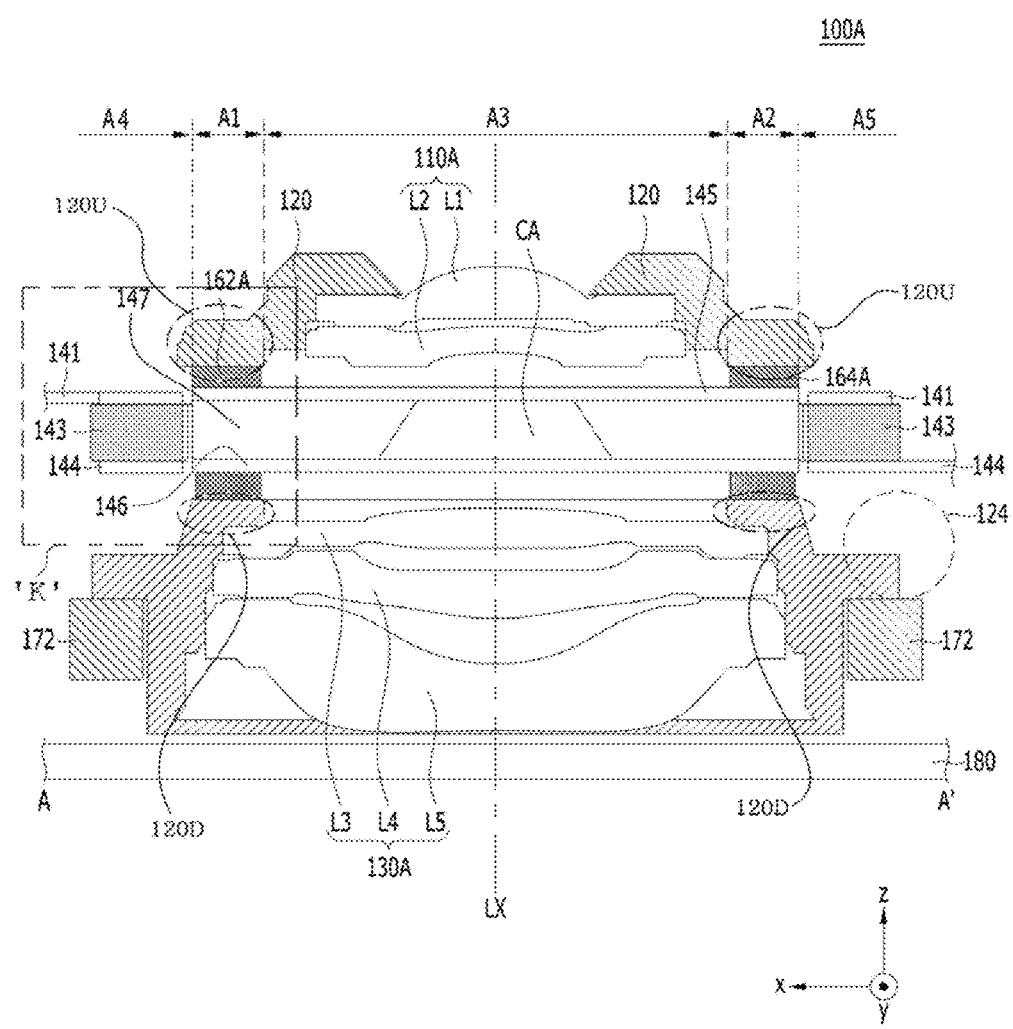
FIG. 3a is a cross-sectional view taken along line A-A' in FIG. 2 illustrating the camera module.
Figure 3B:
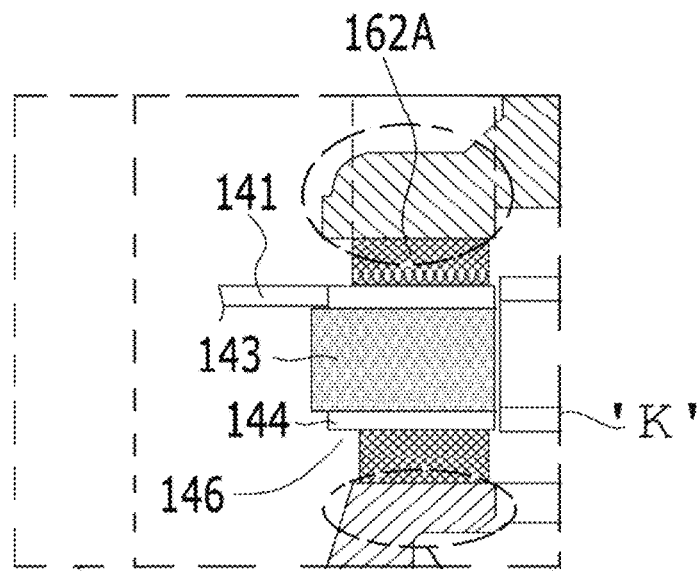

FIG. 3a is a cross-sectional view taken along line A-A' illustrating the camera module 100A illustrated in FIG. 2, and FIG. 3b is an enlarged view illustrating another embodiment of portion "K" of FIG. 3a. For convenience of description, the third adhesive member 166, the first cover 170, the second cover 174, and an optical layer 190 illustrated in FIG. 2 are omitted in FIG. 3a.

Referring to FIGS. 2 to 3b, the lens assembly may include at least one of the liquid lens unit 140, the holder 120, a first lens unit 110 or 110A, a second lens unit 130 or 130A, the first adhesive member 162A, the second adhesive member 164A, or the third adhesive member 166, and may correspond to the lens assembly 22A illustrated in FIG. 1. The lens assembly may be disposed on the main board 150.

In order to distinguish the liquid lens unit 140 from the lens assembly, the first lens unit 110 or 110A and the second lens unit 130 or 130A may be respectively referred to as a "first solid lens unit" and a "second solid lens unit".

The first lens unit 110 or 110A may be disposed at the upper side of the lens assembly, and may be an area to which light is introduced from outside the lens assembly. That is, the first lens unit 110 or 100A may be disposed above the liquid lens unit 140 within the holder 120. The first lens unit 110 or 110A may be configured with a single lens, or may be configured with two or more lenses, which are aligned along a center axis to form an optical system.

Here, the center axis may be an optical axis LX of the optical system, which is formed by the first lens unit 110 or 110A, the liquid lens unit 140, and the second lens unit 130 or 130A included in the camera module 100A, and may be an axis parallel to the optical axis LX. The optical axis LX may correspond to the optical axis of the image sensor 182. That is, the first lens unit 110 or 110A, the liquid lens unit 140, the second lens unit 130 or 130A, and the image sensor 182 may be aligned with and disposed along the optical axis LX via active alignment (AA).

Here, active alignment may mean an operation of aligning the optical axis of each of the first lens unit 110 or 110A, the second lens unit 130 or 130A, and the liquid lens unit 140, and adjusting an axial relationship or distance relationship between the image sensor 182 and the lens units 110 or 110A, 130 or 130A, and 140, in order to acquire an improved image.

In an embodiment, active alignment may be performed by an operation in which the image sensor 182 generates and analyzes image data when receiving light introduced from a specific object via at least one of the first lens unit 110 or 110A, the second lens unit 130 or 130A, or the liquid lens unit 140. For example, active alignment may be performed in the following sequence.

In one example, active alignment (first alignment), which adjusts relative positions between the first lens unit 110 or 110A and the second lens unit 130 or 130A, which are fixed and mounted to the holder 120, and the image sensor 182, is completed, active alignment (second alignment), which adjusts relative positions between the liquid lens unit 140, which is inserted into the holder 120, and the image sensor 182, may be performed. First alignment may be performed as a gripper grips the middle base 172 and displaces the middle base to various positions, and second alignment may be performed as the gripper grips a spacer 143 of the liquid lens unit 140 and displacers the spacer to various positions.

However, active alignment may be performed in any other sequence different from the above-described sequence.

Assuming the case in which the middle base 172 is omitted, active alignment may be performed in the state in which the gripper grips a protruding portion 124 of the holder 120. To inhibit inaccurate alignment when the protruding portion 124 has a small thickness, the camera module 100A may include the middle base 172, which is thicker than the protruding portion 124 of the holder 120. Management of the thickness of the holder 120 may be necessary in order to form the holder 120, which has a complicated shape compared to the shape of the middle base 172, using injection molding or the like. When the thickness of a portion of the holder 120 for active alignment is not sufficient for gripping, the middle base 172 may be added so that active alignment may be performed in the state in which the gripper grips a portion of the middle base 172. However, when the thickness of the protruding portion 124 is sufficiently large, the middle base 172 may be omitted. In addition, the protruding portion 124 and the middle base 172 may be coupled to each other via an adhesive member, for example, epoxy.

In another example, active alignment (third alignment), which adjusts the relative positions between the first lens unit 110 or 110A, the second lens unit 130 or 130A, and the liquid lens unit 140, which are fixed and mounted to the holder 120, is complete. Active alignment (fourth alignment), which adjusts the relative positions between the lens of the lens assembly, which has completely undergone third alignment, and the image sensor 182 may be performed. Third alignment may be performed as a gripper grips the spacer 143 of the liquid lens unit 140 and displaces the spacer to various positions, and fourth alignment may be performed as the gripper grips the middle base 172 and displacers the middle base to various positions.

In addition, as illustrated in FIG. 3a, the first lens unit 110A may include two lenses L1 and L2, but this is merely given by way of example, and the first lens unit 110A may include one lens, two lenses, or three or more lenses.

In addition, an exposure lens may be disposed at the upper side of the first lens unit 110 or 110A. Here, the exposure lens may be an outermost lens among the lenses included in the first lens unit 110 or 110A. That is, the lens L1 located at the uppermost side of the first lens unit 110A may protrude upward, and therefore, may perform a function of the exposure lens. The surface of the exposure lens may be damaged as it protrudes outward from the holder 120. When the surface of the exposure lens is damaged, the quality of an image captured by the camera module 100A may be deteriorated. Therefore, in order to inhibit or suppress damage to the surface of the exposure lens, a glass cover may be disposed, or a coating layer may be formed on the top of the exposure lens. Alternatively, in order to inhibit damage to the surface of the exposure lens, the exposure lens may be formed using a wear-resistant material having higher rigidity than the lenses of the other lens units.

In addition, the outer diameter of each of the lenses L1 and L2 included in the first lens unit 110A may increase in relation to a decreasing distance to the bottom (e.g. in the −z-axis direction), but the embodiment is not limited thereto.

Figure 4A:
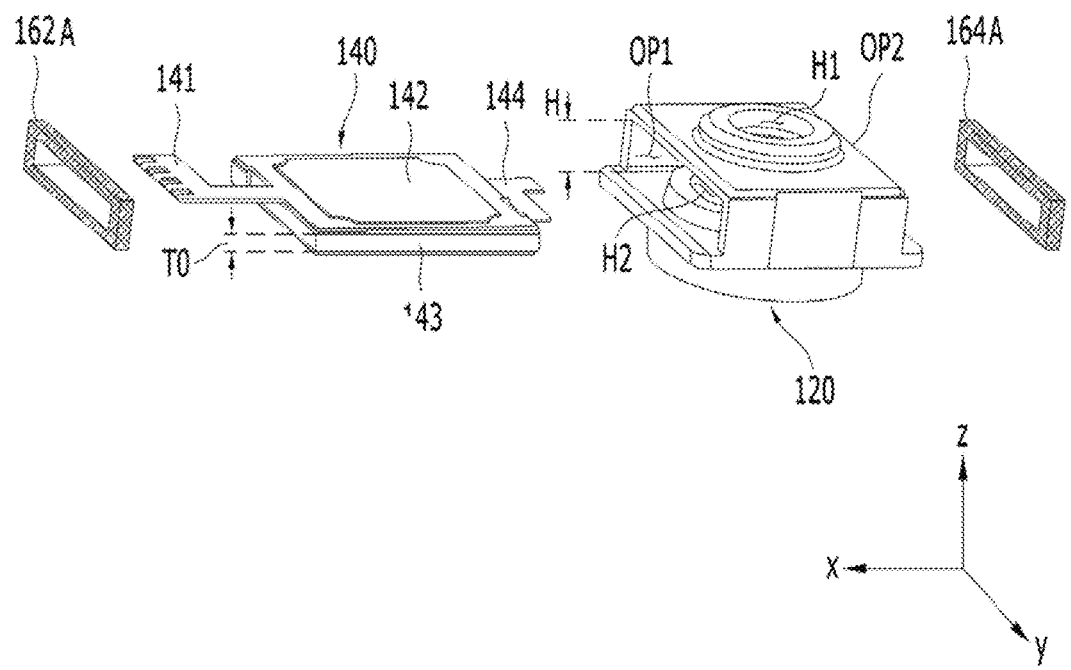
Figure 4B:
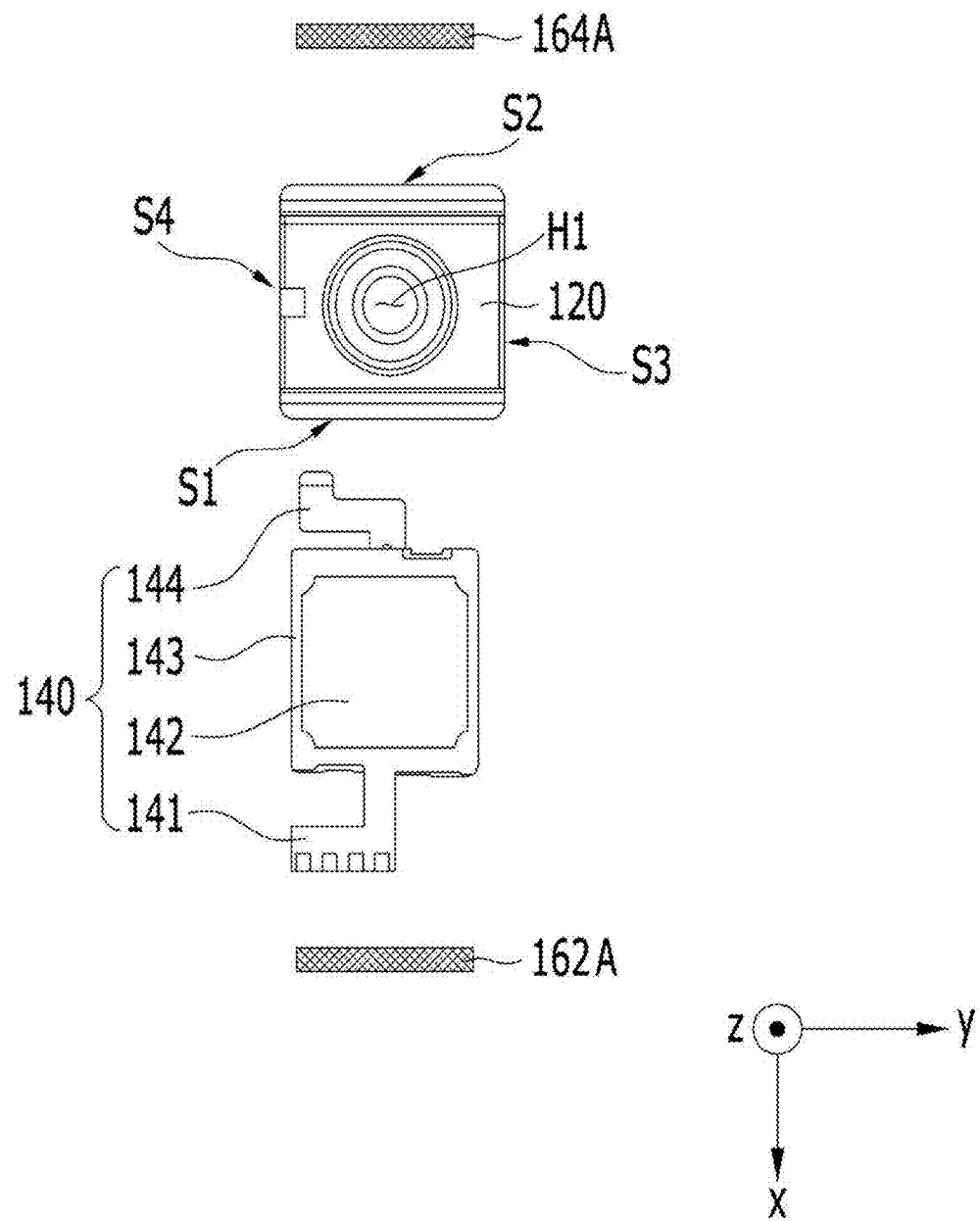
Figure 4C:
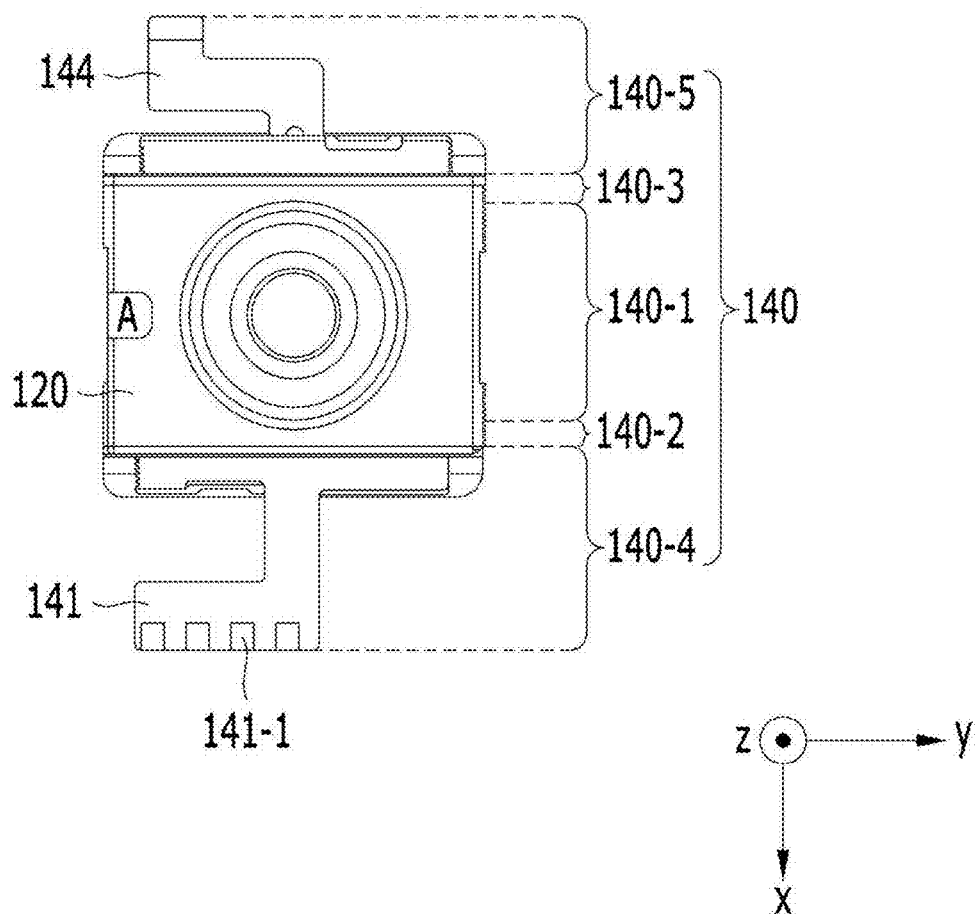
Figure 4D:
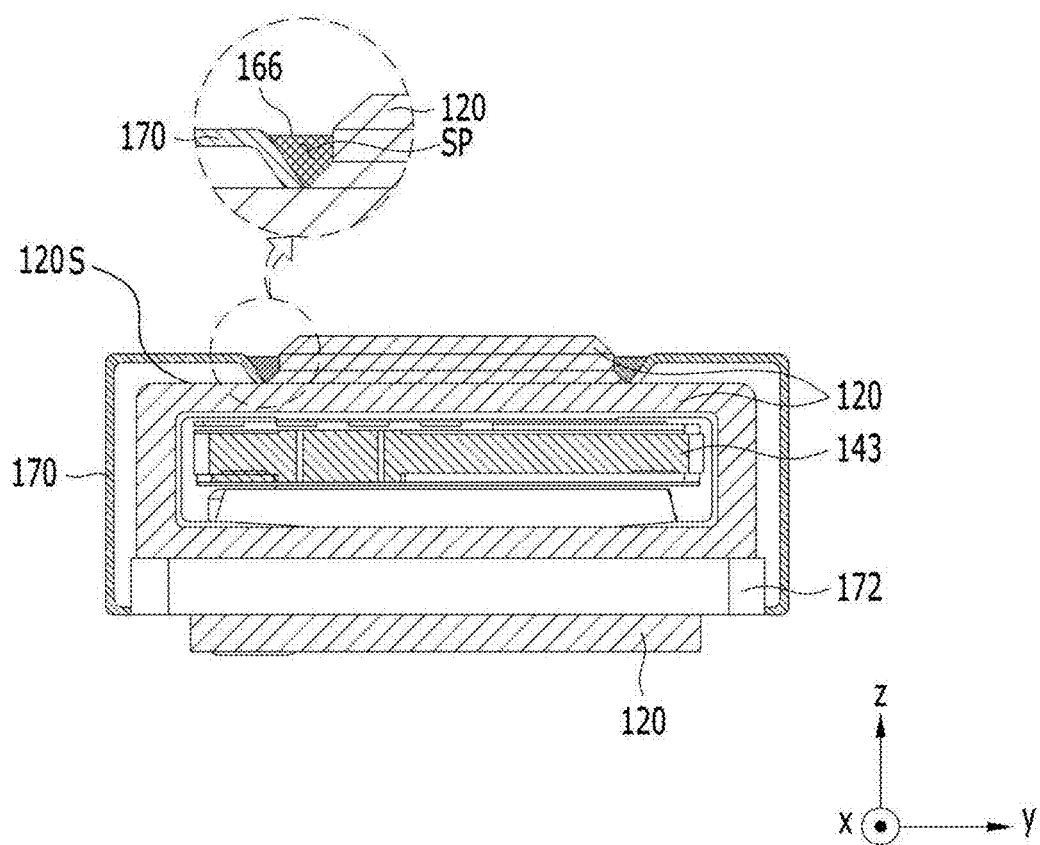

FIGS. 4a to 4d are views for describing the holder 120, the liquid lens unit 140, the first adhesive member 162A, the second adhesive member 164A, and the third adhesive member 166 illustrated in FIGS. 2 and 3a. FIG. 4a illustrates an exploded perspective view of the holder 120, the liquid lens unit 140, the first adhesive member 162A, and the second adhesive member 164A, FIG. 4b illustrates an exploded plan view of the holder 120, the liquid lens unit 140, the first adhesive member 162A, and the second adhesive member 164A. FIG. 4c illustrates an assembled plan view of the holder 120 and the liquid lens unit 140. FIG. 4d illustrates an assembled cross-sectional view of the spacer 143, the first cover 170, the holder 120, the middle base 172, and the third adhesive member 166.

The holder 120 may include first and second holes H1 and H2 and first to fourth sidewalls (or side surfaces or side portions) S1, S2, S3 and S4.

The first and second holes H1 and H2 may be formed respectively in the top and the bottom of the holder 120 to open the top and the bottom of the holder 120 respectively. Here, the first hole H1 and the second hole H2 may be through-holes. The first lens unit 110 or 110A may be accommodated in, mounted in, seated in, in contact with, fixed to, provisionally fixed to, supported by, coupled to, or disposed in the first hole H1, which is formed in the holder 120, and the second lens unit 130 or 130A may be accommodated in, mounted in, seated in, in contact with, fixed to, provisionally fixed to, supported by, coupled to, or disposed in the second hole H2, which is formed in the holder 120.

In addition, the first and second sidewalls S1 and S2 of the holder 120 may be disposed so as to face each other in the direction (e.g. the x-axis direction) perpendicular to the direction of the optical axis LX, and the third and fourth sidewalls S3 and S4 may be disposed so as to face each other in the direction (e.g. the y-axis direction) perpendicular to the direction of the optical axis LX. In addition, as illustrated in FIG. 4a, the first sidewall S1 of the holder 120 shown in FIG. 4b may include a first opening OP1, and the second sidewall S2 shown in FIG. 4b may include a second opening OP2 having a shape equal to or similar to that of the first opening OP1. Thus, the first opening OP1 located in the first sidewall S1 and the second opening OP2 located in the second sidewall S2 may be disposed so as to face each other in the direction (e.g. the x-axis direction) perpendicular to the direction of the optical axis LX.

The inner space of the holder 120 in which the liquid lens unit 140 may be disposed may be accessible by the first and second openings OP1 and OP2. At this time, the liquid lens unit 140 may be inserted through the first or second opening OP1 or OP2 so as to be mounted in, seated in, in contact with, fixed to, provisionally fixed to, supported by, coupled to, or disposed in the inner space of the holder 120. For example, the liquid lens unit 140 may be inserted into the inner space of the holder 120 through the first opening OP1.

In order to allow the liquid lens unit 140 to be inserted into the inner space of the holder 120 through the first or second opening OP1 or OP2, the size of the first or second opening OP1 or OP2 may be greater than the cross-sectional area of the liquid lens unit 140 in the y-axis and z-axis directions. For example, the height H corresponding to the size of each of the first and second openings OP1 and OP2 in the direction of the optical axis LX may be greater than the thickness TO of the liquid lens unit 140.

The second lens unit 130 or 130A may be disposed below the liquid lens unit 140 within the holder 120. The second lens unit 130 or 130A may be spaced apart from the first lens unit 110 or 110A in the optical-axis direction (e.g. the z-axis direction).

The light introduced into the first lens unit 110 or 110A from outside the camera module 100A may pass through the liquid lens unit 140 and be introduced into the second lens unit 130 or 130A. The second lens unit 130 or 130A may be configured with a single lens, or may be configured with two or more lenses, which are aligned along a center axis to form an optical system. For example, as illustrated in FIG. 3a, the second lens unit 130A may include three lenses L3, L4 and L5, but this is merely given by way of example, and one or two lenses or four or more lenses may be included in the second lens unit 130 or 130A.

In addition, the outer diameter of each of the lenses L3, L4 and L5 included in the second lens unit 130A may increase in relation to a decreasing distance to the bottom (e.g. in the −z-axis direction), but the embodiment is not limited thereto.

Unlike the liquid lens unit 140, each of the first lens unit 110 or 110A and the second lens unit 130 or 130A may be a solid lens formed of glass or plastic, but the embodiment is not limited as to a specific material of each of the first lens unit 110 or 110A and the second lens unit 130 or 130A.

Referring to FIG. 4c, the liquid lens unit 140 may include a first portion 140-1 to a fifth portion 140-5.

In the liquid lens unit 140, the first portion 140-1 may be a portion that is mounted in, seated in, in contact with, fixed to, provisionally fixed to, supported by, coupled to, or disposed in the inner space between the first hole H1 and the second hole H2 in the holder 120 in the direction of the optical axis LX or the direction parallel to the direction of the optical axis LX (e.g. the z-axis direction). That is, the first portion 140-1 of the liquid lens unit 140 may be disposed between the first lens unit 110 or 110A and the second lens unit 130 or 130A. However, the embodiment is not limited thereto. For example, according to another embodiment, the first lens unit 110 or 110A or the second lens unit 130 or 130A may be omitted, the liquid lens unit 140 may be disposed above the first lens unit 110 or 110A within the holder 120, or the liquid lens unit 140 may be disposed below the second lens unit 130 or 130A within the holder 120. In addition, the first portion 140-1 of the liquid lens unit 140 may be a portion that is mounted in, seated in, in contact with, fixed to, provisionally fixed to, supported by, coupled to, or disposed in the inner space between the first opening OP1 and the second opening OP2 in the holder 120 in the direction perpendicular to the direction of the optical axis LX (e.g. the x-axis direction).

In addition, the second and third portions 140-2 and 140-3 of the liquid lens unit 140 may be portions that are respectively disposed in the first and second openings OP1 and OP2 in the holder 120. The second and third portions 140-2 and 140-3 are described below in detail along with descriptions of the first and second adhesive members 162A and 164A.

In addition, the fourth portion 140-4 of the liquid lens unit 140 may be a portion that protrudes from the first sidewall S1 of the holder 120. For example, as illustrated in FIG. 4c, the fourth portion 140-4 of the liquid lens unit 140 may a portion protruding from the first opening OP1 formed in the first sidewall S1 of the holder 120. That is, the fourth portion 140-4 may protrude outward from the holder 120 at the side of the first opening OP1.

In addition, the fifth portion 140-5 of the liquid lens unit 140 may be a portion that protrudes from the second sidewall S2 of the holder 120. For example, as illustrated in FIG. 4c, the fifth portion 140-5 of the liquid lens unit 140 may a portion protruding from the second opening OP2 formed in the second sidewall S2 of the holder 120. That is, the fifth portion 140-5 may protrude outward from the holder 120 at the side of the second opening OP2.

In addition, referring to FIG. 3a, the liquid lens unit 140 may include first to fifth areas A1, A2, A3, A4 and A5.

The first area A1 is an area disposed inside the first opening OP1 in the holder 120 and corresponds to the second portion 140-2 illustrated in FIG. 4c, the second area A2 is an area disposed inside the second opening OP2 in the holder 120 and corresponds to the third portion 140-3 illustrated in FIG. 4c, and the third area A3 is an area between the first area A1 and the second area A2 and corresponds to the first portion 140-1 illustrated in FIG. 4c. The fourth area A4 is an area protruding from the first opening OP1 in the holder 120 and corresponds to the fourth portion 140-4 illustrated in FIG. 4c. That is, the fourth area A4 is an area disposed outside the holder 120 at the side of the first opening OP1. The fifth area A5 is an area protruding from the second opening OP2 in the holder 120 and corresponds to the fifth portion 140-5 illustrated in FIG. 4c. That is, the fifth area A5 is an area disposed outside the holder 120 at the side of the second opening OP2.

In addition, as illustrated in FIG. 2, the liquid lens unit 140 may include a first connection substrate (or an individual electrode connection substrate) 141, a liquid lens (or a liquid lens body) 142, the spacer 143, and a second connection substrate (or a common electrode connection substrate) 144.

The first connection substrate 141 may electrically connect a plurality of first electrodes (not illustrated) included in the liquid lens 142 to the main board 150, and may be disposed above the liquid lens 142. The first connection substrate 141 may be implemented as a flexible printed circuit board (FPCB).

In addition, the first connection substrate 141 may be electrically connected to an electrode pad 150-1, which is formed on the main board 150, via a connection pad 141-1, which is electrically connected to each of a plurality of first electrodes. To this end, after the liquid lens unit 140 is inserted into the inner space of the holder 120, the first connection substrate 141 may be subjected to bending in the −z-axis direction toward the main board 150, and thereafter the connection pad 141-1 and the electrode pad 150-1 may be electrically connected to each other via conductive epoxy. In another embodiment, the first connection substrate 141 may be connected to a first holder surface electrode, which is disposed, formed, or coated on the surface of the holder 120, so as to be electrically connected to the main board 150 via the first holder surface electrode, which is conductive and is disposed on the surface of the holder 120, but the embodiment is not limited thereto.

The second connection substrate 144 may electrically connect a second electrode (not illustrated) included in the liquid lens 142 to the main board 150, and may be disposed below the liquid lens 142. The second connection substrate 144 may be implemented as an FPBC or a single metal substrate (conductive metal plate). Here, the first and second electrodes are described below in detail with reference to FIGS. 10a to 10i.

The second connection substrate 144 may be electrically connected to an electrode pad, which is formed on the main board 150, via a connection pad, which is electrically connected to the second electrode. To this end, after the liquid lens unit 140 is inserted into the inner space of the holder 120, the second connection substrate 144 may be subjected to bending in the −z-axis direction toward the main board 150. In another embodiment, the second connection substrate 144 may be connected to a second holder surface electrode, which is disposed, formed, or coated on the surface of the holder 120, so as to be electrically connected to the main board 150 via the second holder surface electrode, which is conductive and is disposed on the surface of the holder 120, but the embodiment is not limited thereto.

FIGS. 4a to 4d illustrate the state before each of the first and second connection substrates 141 and 144 bends.

The liquid lens 142 may include a cavity CA. As illustrated in FIG. 3a, the open area in the direction in which light is introduced into the cavity CA may be smaller than the open area in the opposite direction. Alternatively, the liquid lens 142 may be disposed such that the direction of inclination of the cavity CA is opposite to the illustration. That is, unlike the illustration of FIG. 3a, the open area in the direction in which light is introduced into the cavity CA may be greater than the open area in the opposite direction. In addition, when the liquid lens 142 is disposed such that the direction of inclination of the cavity CA is opposite to the illustration, a part or the entirety of the arrangement of components included in the liquid lens 142 may be changed, or only the direction of inclination of the cavity CA may be changed and the remainder of the arrangement may not be changed, according to the direction of inclination of the liquid lens 142. A detailed configuration of the liquid lens 142 is described below in detail with reference to FIGS. 10*a* to 10*i*.

The spacer 43 may be disposed so as to surround the lateral surface of the liquid lens 142, and may protect the liquid lens 142 from external shocks. To this end, the spacer 143 may be configured so as to allow the liquid lens 142 to be mounted in, seated in, in contact with, fixed to, provisionally fixed to, supported by, coupled to, or disposed in the spacer.

For example, the spacer 143 may include a hollow space 143H in which the liquid lens 142 is accommodated, and a frame configured to surround the hollow space 143H formed in the center thereof. As such, the spacer 143 may have a centrally-hollowed square planar shape (hereinafter, referred to as a "⊔"-shaped form), but the embodiment is not limited thereto.

In addition, the spacer 143 may be disposed between the first connection substrate 141 and the second connection substrate 144, and may be disposed so as to protrude from at least one of the first or second opening OP1 or OP2 in the holder 120. That is, at least a portion of the spacer 143 may be shaped so as to protrude, along with the first and second connection substrates 141 and 144, from at least one of the first or second sidewall S1 or S2 of the holder 120 in the direction perpendicular to the optical axis LX (e.g. the x-axis direction). This is because the length of the spacer 143 in the x-axis direction is greater than the length of the holder 120 in the x-axis direction. Thus, portions of the spacer 143, which protrude from the first and second sidewalls S1 and S2, may respectively correspond to the fourth and fifth portions 140-4 and 140-5 of the liquid lens unit 140 illustrated in FIG. 4*c* (i.e. the fourth area A4 and the fifth area A5 illustrated in FIG. 3*a*).

In addition, the spacer 143 may be brought into contact with a gripper when the spacer 143 is inserted into the holder 120 and during active alignment.

In addition, at least a portion of the spacer 143 may be disposed in at least one of the first opening OP1 or the second opening OP2. In the case of FIG. 3*a*, the spacer 143 is illustrated as not being disposed in the first opening OP1 and the second opening OP2. However, unlike the illustration, as illustrated in FIGS. 2, 4*a* and 4*b*, it can be appreciated by one of ordinary skill in the art that at least a portion of the spacer 143 may be disposed in each of the first and second openings OP1 and OP2 since the spacer 143 has a "⊔"-shaped form and surrounds the liquid lens 142.

In addition, at least a portion of the liquid lens 142 may be disposed in at least one of the first opening OP1 or the second opening OP2. Referring to FIG. 3*a*, it can be appreciated that a first plate 147 of the liquid lens 142, which is a component of the liquid lens 142, is disposed in each of the first and second openings OP1 and OP2.

In addition, as illustrated in FIG. 3*b*, only at least a portion of the spacer 143 may be disposed in each of the first and second openings OP1 and OP2, and the liquid lens 142 may not be disposed therein.

Meanwhile, the first adhesive member 162A may be disposed between the holder 120 and the liquid lens unit 140 inside the first opening OP1 in the holder 120. The first adhesive member 162A may be disposed on the first area A1 of the liquid lens unit 140, and may be disposed on the upper surface, the lower surface, and the side portion of the second portion 140-2.

In addition, the second adhesive member 164A may be disposed between the holder 120 and the liquid lens unit 140 inside the second opening OP2 in the holder 120. The second adhesive member 164A may be disposed on the second area A2 of the liquid lens unit 140, and may be disposed on the upper surface, the lower surface, and the side portion of the third portion 140-3.

In addition, referring to FIG. 3*a*, the holder 120 may include a holder upper area 120U disposed above the liquid lens unit 140 and a holder lower area 120D disposed below the liquid lens unit 140. At this time, each of the first and second adhesive members 162A and 164A may couple each of the holder upper area 120U and the holder lower area 120D to the liquid lens unit 140.

As described above, when the first and second adhesive members 162A and 164A are disposed, the liquid lens unit 140 may be stably fixed and coupled to the holder 120.

In addition, each of the first and second adhesive members 162A and 164A illustrated in FIGS. 2 and 4*a* to 4*c* is illustrated as having a hexahedral shape, but the embodiment is not limited thereto. That is, the first and second adhesive members 162A and 164A are not limited to a specific shape so long as the first and second adhesive members 162A and 164A may be disposed between the liquid lens unit 140 and the holder 120 in each of the first and second openings OP1 and OP2. That is, the first adhesive member 162A may have a shape corresponding to the shape of the first opening OP1, and the second adhesive member 164A may have a shape corresponding to the shape of the second opening OP2 The first cover 170 may be disposed so as to surround the holder 120, the liquid lens unit 140, the third adhesive member 166, and the middle base 172, and may protect these 120, 140, 166 and 172 from external shocks. In particular, when the first cover 170 is disposed, a plurality of lenses, which forms an optical system, may be protected from external shocks.

In addition, to allow the first lens unit 110 or 110A disposed in the holder 120 to be exposed to external light, the first cover 170 may include an upper opening 170H formed in the upper surface of the first cover 170.

In addition, a window formed of a light-transmitting material may be disposed in the upper opening 170H. This may inhibit foreign substances, such as dust or moisture, from being introduced into the camera module 100A.

Referring to FIG. 4*d*, the first cover 170 may be disposed so as to cover the upper surface of the holder 120 and the first to fourth sidewalls S1, S2, S3, and S4 shown in FIG. 4*b*.

At this time, the third adhesive member 166 may be disposed so as to fill the space (or the gap) SP between the upper surface of the holder 120 and the first cover 170. In some cases, the third adhesive member 166 may be omitted. In this case, the space SP between the upper surface of the holder 120 and the first cover 170 may be empty.

In the case of FIG. 2, the third adhesive member 166 is illustrated as having a doughnut shape. This is because the upper opening 170H in the first cover 170 has a circular shape and the holder 120 has an upwardly protruding circular upper surface. However, the third adhesive member 166 may have any of various shapes depending on the shape of the upper opening 170H in the first cover 170 and the shape of the upper surface of the holder 120.

As described above, when the third adhesive member 166 is disposed so as to fill the space SP between the upper surface of the holder 120 and the first cover 170 in the state in which the first and second adhesive members 162A and 164A are disposed so as to fill the empty space between the holder 120 and the liquid lens unit 140 in the first and second openings OP1 and OP2, the inner space IS of the holder 120 in which the third area A3 of the liquid lens unit 140 (i.e. the first portion 140-1) is disposed may be sealed from the outside, but the embodiment is not limited thereto. That is, the first to third adhesive members 162A, 164A and 166 may have any of various shapes so long as they seal the inside of the holder 120 so as to inhibit foreign substances from being introduced into the holder 120 through at least one of the first or second opening OP1 or OP2.

When foreign substances are introduced into the holder 120, in which the third area A3 of the liquid lens unit 140 (i.e. the first portion 140-1) is disposed, through at least one of the first opening OP1, the second opening OP2, or the space SP, the optical performance of the camera module 100A may be deteriorated.

However, since the first, second, and third adhesive members 162A, 164A, and 166 seal the inner space of the holder 120 of the camera module 100A, according to certain embodiments in which the first portion 140-1 of the liquid lens unit 140 is disposed, it is possible to inhibit foreign substances from being introduced into the first portion 140-1 of the liquid lens unit 140, which may improve the optical performance of the camera module 100A and may reduce a defective proportion.

Referring to FIGS. 2 and 3a, the middle base 172 may be disposed so as to surround the second hole H2 in the holder 120. To this end, the middle base 172 may include an accommodating hole 172H for accommodating the second hole H2 therein. The inner diameter of the middle base 172 (i.e. the diameter of the accommodating hole 172H) may be equal to or greater than the outer diameter of the second hole H2.

Here, both the accommodating hole 172H in the middle base 172 and the second hole H2 are illustrated as having a circular shape, but the embodiment is not limited thereto, and these holes may be changed to various other shapes.

In the same manner as the upper opening 170H in the first cover 170, the accommodating hole 172H may be formed near the center of the middle base 172 at a position corresponding to the position of the image sensor 182, which is disposed in the camera module 100A.

The middle base 172 may be mounted on the main board 150 so as to be spaced apart from a circuit element 151 on the main board 150. That is, the holder 120 may be disposed on the main board 150 so as to be spaced apart from the circuit element 151.

The second cover 174 may be mounted on the top of the main board 150, and may protect the members 110, 120, 130, and 140 to 172 as well as the circuit element 151 disposed on the top of the main board 150 from external shocks. The second cover 174 may include the space for accommodating the circuit element 151 therein, in consideration of the shape and position of the circuit element 151 disposed on the main board 150. In addition, the second cover 174 may include the space in which the lens assembly 110 to 140, 162A and 164A is mounted, seated, in contact with, fixed, provisionally fixed, supported, or coupled, in consideration of the shape and position of the lens assembly 110 to 140, 162A, and 164A.

In the same manner as the first cover 170, the second cover 174 may include an opening 174H near the center thereof. The opening 174H may be formed at a position corresponding to the position of the image sensor 182, which is disposed in the camera module 100A.

The main board 150 may be disposed below the middle base 172, and may include a recess in which the image sensor 182 may be mounted, seated, in contact with, fixed, provisionally fixed, supported, coupled, or accommodated, the circuit element 151, a connection portion (or an FPCB) 152, and a connector 153.

The circuit element 151 of the main board 150 may configure a control module, which controls the liquid lens unit 140 and the image sensor 182. Here, the control module is described below with reference to FIG. 11. The circuit element 151 may include at least one of a passive element or an active element, and may have any of various widths and heights. The circuit element 151 may mean a plurality of circuit elements, and may have a height greater than the height of the main board 150 so as to protrude outward. The plurality of circuit elements 151 may be disposed so as not to overlap the holder 120 in the direction parallel to the optical axis LX. For example, the plurality of circuit elements 151 may include a power inductor, a gyro sensor, and the like, but the embodiment is not limited as to a specific type of the circuit elements 151.

The main board 150 may include a holder area on which the holder 120 is disposed and an element area on which the plurality of circuit elements 151 is disposed.

The main board 150 may be implemented as a rigid flexible printed circuit board (RFPCB) including the FPCB 152. The FPCB 152 may be subjected to bending based on the requirement of the space in which the camera module 100A is mounted.

The image sensor 182 may perform a function of converting the light that has passed through the first lens unit 110 or 110A, the liquid lens unit 140, and the second lens unit 130 or 130A of the lens assembly 110, 120, 130, 140, 162A, and 164A into image data. More specifically, the image sensor 182 may generate image data by converting light into an analog signal via a pixel array including a plurality of pixels and synthesizing a digital signal corresponding to the analog signal.

Figure 5A:
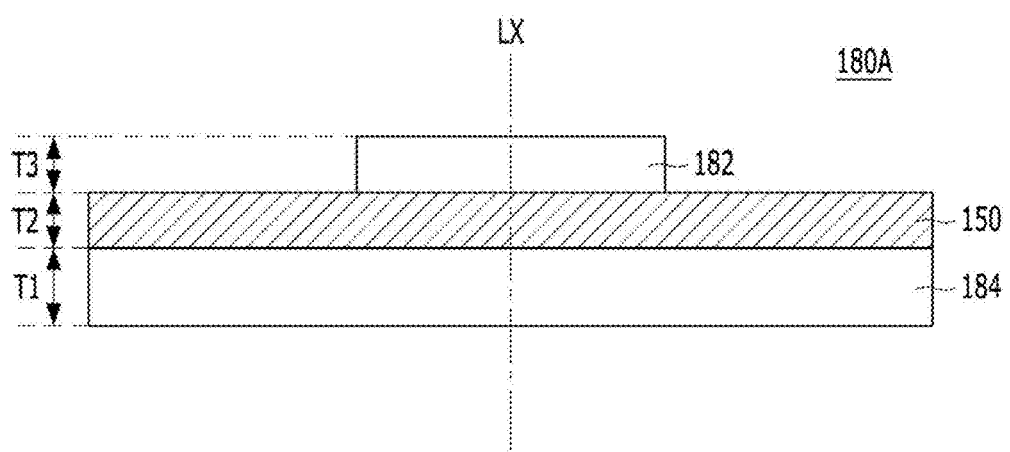
Figure 5B:
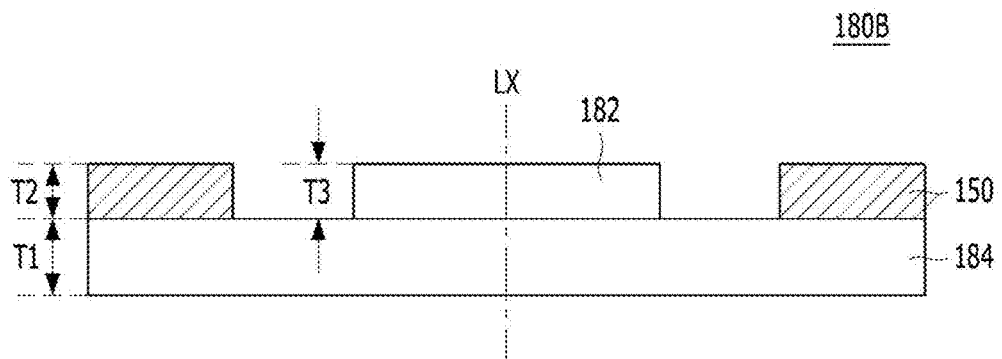

FIGS. 5a and 5b are cross-sectional views illustrating embodiments 180A and 180B of a lower member 180 illustrated in FIG. 3a.

The lower member 180 may include the main board 150 and the image sensor 182 illustrated in FIG. 2, and may further include a stiffener 184.

According to one embodiment, the lower member 180A illustrated in FIG. 5a may include the stiffener 184, the main board 150, and the image sensor 182. Here, the main board 150 and the image sensor 182 respectively correspond to the main board 150 and the image sensor 182 illustrated in FIG. 2, and thus are designated by the same reference numerals, and a repeated description thereof is omitted.

The main board 150 may be disposed on the stiffener 184, and the image sensor 182 may be disposed on the main board 150. The stiffener 184 serves to support the main board 150 and the image sensor 182 since each of the main board 150 and the image sensor 182 has a small thickness. In addition, the stiffener 184, the main board 150, and the image sensor 182 may be separately disposed as illustrated in FIG. 5a, or may be integrally formed, unlike the illustration of FIG. 5a.

According to another embodiment, the lower member 180B illustrated in FIG. 5b may include the stiffener 184, the main board 150, and the image sensor 182. The main board 150 and the image sensor 182 illustrated in FIG. 5b respectively correspond to the main board 150 and the image sensor 182 illustrated in FIG. 2, and thus are designated by the same reference numerals, and a repeated description thereof is omitted.

In addition, the stiffener 184, the main board 150, and the image sensor 182 may be separately disposed as illustrated in FIG. 5b, or may be integrally formed, unlike the illustration of FIG. 5b.

As illustrated in FIGS. 5a and 5b, the main board 150 may be disposed above the stiffener 184. For example, the image sensor 182 may be mounted on the main board 150 as illustrated in FIG. 5a, or may be mounted on the stiffener 184 in a recess formed in the main board 150 as illustrated in FIG. 5b. The stiffener 184 serves to support the main board 150 and the image sensor 182 since each of the main board 150 and the image sensor 182 has a small thickness. Thus, the stiffener 184 may be omitted when each of the main board 150 and the image sensor 182 does not have a small thickness. For example, in FIGS. 5a and 5b, the first thickness T1 of the stiffener 184 may be 0.15 mm, the second thickness T2 of the main board 150 may range from 0.2 mm to 0.35 mm, and the third thickness T3 of the image sensor 182 may be 0.12 mm, but the embodiment is not limited thereto.

The stiffener 184 described above may be formed of ceramics, but the embodiment is not limited as to a specific material of the stiffener 184.

Meanwhile, the connector 153 may electrically connect the main board 150 to a power supply or any other device (e.g. an application processor) outside the camera module 100A.

Hereinafter, an embodiment of a method of manufacturing the camera module 100A is described with reference to the accompanying drawings.

First, the image sensor 182 may be mounted on the main board 150, and the holder 120 to which the middle base 172 and the second cover 174 are coupled may be mounted on, seated on, in contact with, provisionally fixed to, supported by, coupled to, or disposed on the main board 150.

At this time, active alignment (first alignment) between the first lens unit 110 or 110A and the second lens unit 130 or 130A, which are mounted in the holder 120, and the image sensor 182 may be performed. First alignment may be performed by adjusting positions of the middle base 172 and the holder 120 while supporting opposite sides of the middle base 172. First alignment may be performed while moving a jig, which presses and fixes opposite sides of the middle base 172. The middle base 172 may be fixed to the main board 150 in the completed state of first alignment.

Subsequently, the liquid lens unit 140 may be inserted into the holder 120 through at least one of the first opening OP1 or the second opening OP2 in the holder 120, and active alignment (second alignment) between the liquid lens unit 140 and the image sensor 182 may be performed. Second alignment may be performed by adjusting the position of the liquid lens unit 140 while supporting the liquid lens unit 140 in the x-axis direction. Second alignment may be performed while moving a jig, which presses and fixes the liquid lens unit 140 in the x-axis direction.

Subsequently, the first and second adhesive members 162A and 164A may be respectively formed in the empty space between the holder 120 and the liquid lens unit 140 in each of the first and second openings OP1 and OP2 so as to fix the liquid lens unit 140 to the holder 120.

Subsequently, each of the first connection substrate 141 and the second connection substrate 144 may be subjected to bending so as to be electrically connected to the main board 150. After the bending process, a soldering process is performed for electrical connection between each of the first connection substrate 141 and the second connection substrate 144 and the main board 150.

Subsequently, the first lens unit 110, the holder 120, the second lens unit 130, the liquid lens unit 140, and the middle base 172 are covered with the first cover 170 so as to complete the camera module 100A. At this time, the third adhesive member 166 may be formed in the space SP between the first cover 170 and the upper surface of the holder 120 so as to seal the inner space of the holder 120.

Subsequently, a camera module 100B according to another embodiment is described with reference to FIGS. 6 to 9c.

Figure 6:
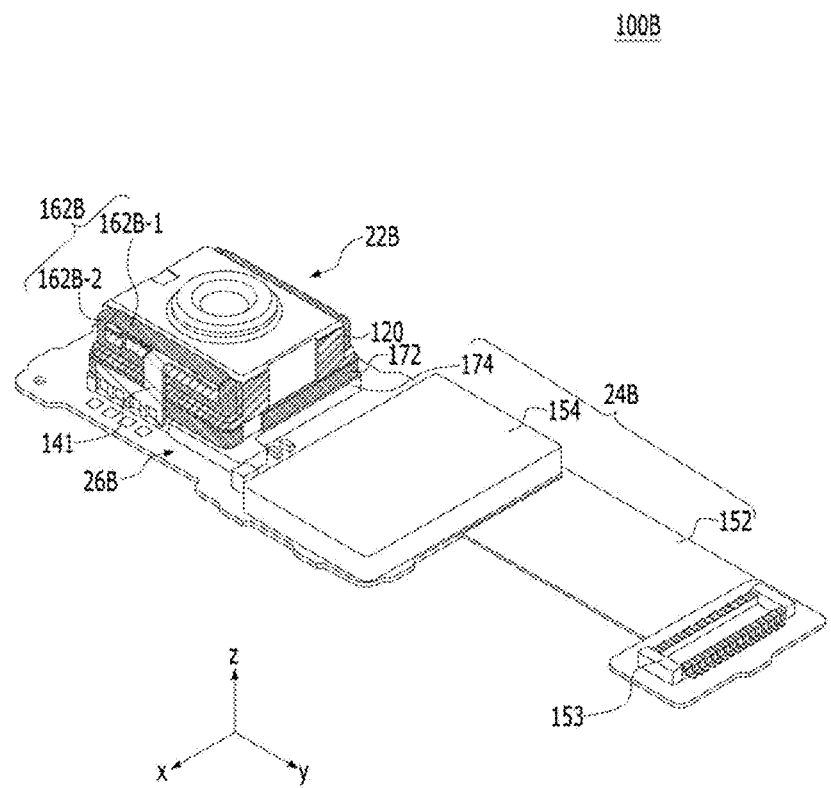
FIG. 6 is a schematic perspective view illustrating a camera module according to another embodiment.

FIG. 6 is a schematic perspective view illustrating the camera module 100B according to another embodiment.

Referring to FIG. 6, the camera module 100B may include a lens assembly 22B, a control circuit 24B, and an image sensor 26B. The control circuit 24B and the image sensor 28B may be disposed on a single board. The lens assembly 22B, the control circuit 24B, and the image sensor 26B of the camera module 100B illustrated in FIG. 6 respectively perform the same function as each of the lens assembly 22A, the control circuit 24A, and the image sensor 26A of the camera module 100A illustrated in FIG. 1, and thus a repeated description of the lens assembly 22B, the control circuit 24B, and the image sensor 26B is omitted.

Figure 7:
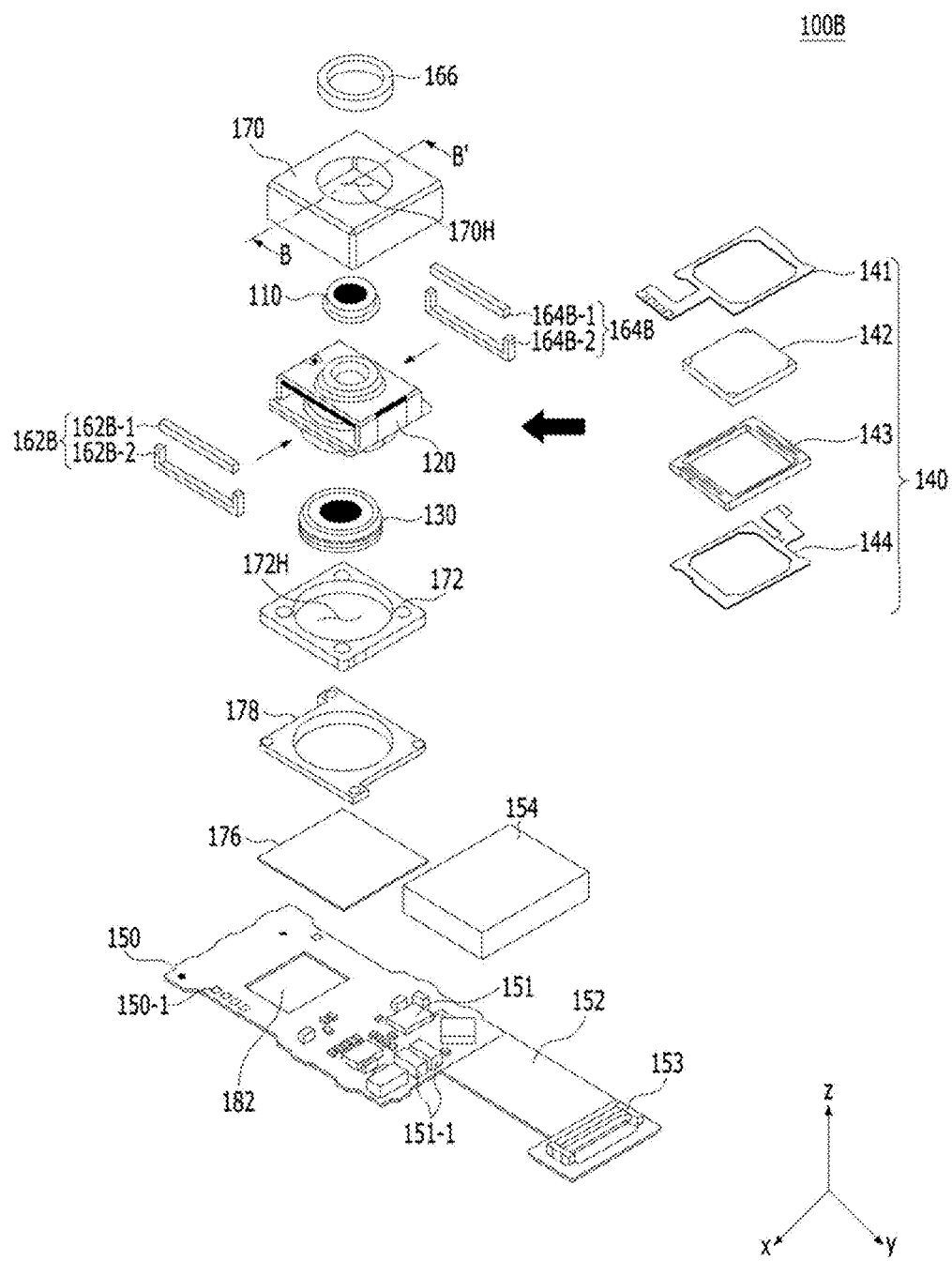
FIG. 7 is an exploded perspective view of the camera module illustrated in FIG. 6 according to the embodiment.

FIG. 7 is an exploded perspective view of the camera module 100B illustrated in FIG. 6 according to the embodiment.

Referring to FIG. 7, the camera module 100B may include a lens assembly, the main board 150, and the image sensor 182. In addition, the camera module 100B may further include the first cover 170 and the middle base 172. In addition, the camera module 100B may further include at least one adhesive member. The at least one adhesive member serves to couple or fix the liquid lens unit 140 to the holder 120. In the case of FIG. 7, the at least one adhesive member is illustrated as including all of the third adhesive member 166, a fourth adhesive member 162B, and a fifth adhesive member 164B, but the embodiment is not limited thereto. That is, according to another embodiment, the at least one adhesive member may include some of the third adhesive member 166, the fourth adhesive member 162B, and the fifth adhesive member 164B.

In addition, in one embodiment the camera module 100B may further include a sensor base 178 and a filter 176, or in another embodiment the camera module 100B may not include the sensor base 178 and the filter 176 as illustrated in FIG. 2. In addition, the camera module 100B may further include a circuit cover 154.

The camera module 100A illustrated in FIG. 2 includes the second cover 174, whereas the camera module 100B illustrated in FIG. 7 includes the circuit cover 154, instead of the second cover 174. The circuit cover 154 may have an electromagnetic shielding function. In addition, the fourth adhesive member 162B illustrated in FIG. 7 may have a shape different from that of the first adhesive member 162A illustrated in FIG. 2, and the fifth adhesive member 164B may be disposed at a position different from the position at which the second adhesive member 164A illustrated in FIG. 2 is disposed. In addition, the camera module 100B illustrated in FIG. 7 further includes the sensor base 178 and the filter 176, unlike the illustration of FIG. 2. However, the second cover 174 illustrated in FIG. 2 may have substantially the same role as the sensor base 178 illustrated in FIG. 7.

Except for the differences described above, the camera module 100B illustrated in FIG. 7 is the same as the camera module 100A illustrated in FIG. 2, and thus the same reference numerals are given to the same parts, and a repeated description thereof is omitted.

According to the embodiment, at least one of the components 110 to 176 of the camera module 100B illustrated in FIG. 7 may be omitted. Alternatively, at least one other element, which is different from the components 110 to 176 illustrated in FIG. 7, may be additionally included in the camera module 100B.

Figure 8A:
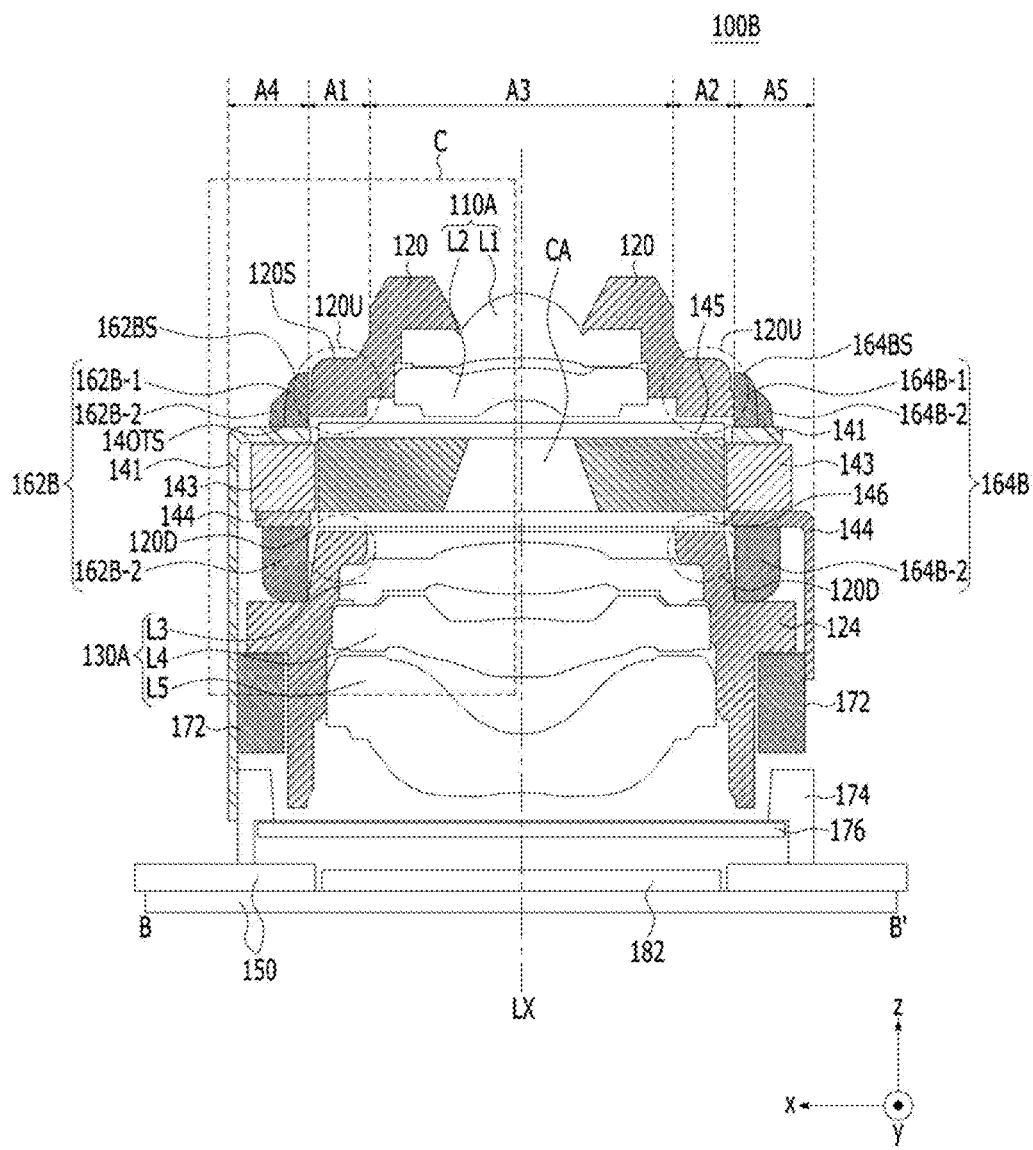
FIGS. 8a to 8c are respectively a cross-sectional view, a side view, and a perspective view of the camera module illustrated in FIG. 7.
Figure 8B:
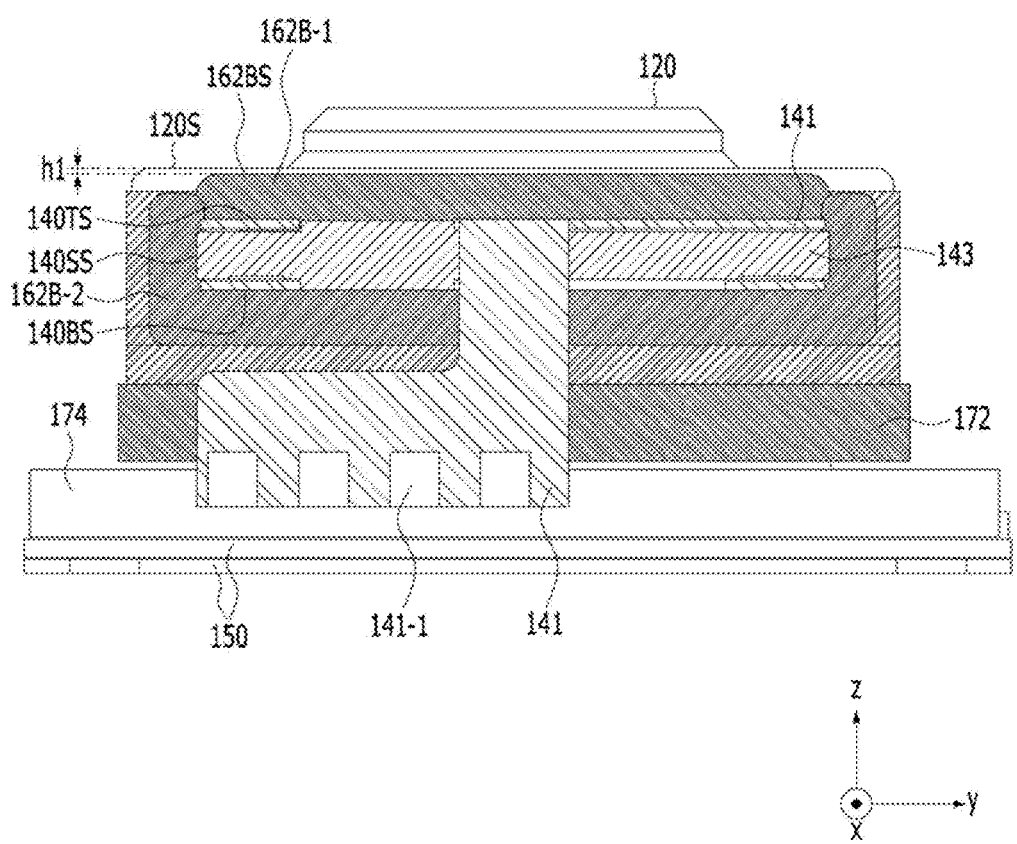
Figure 8C:
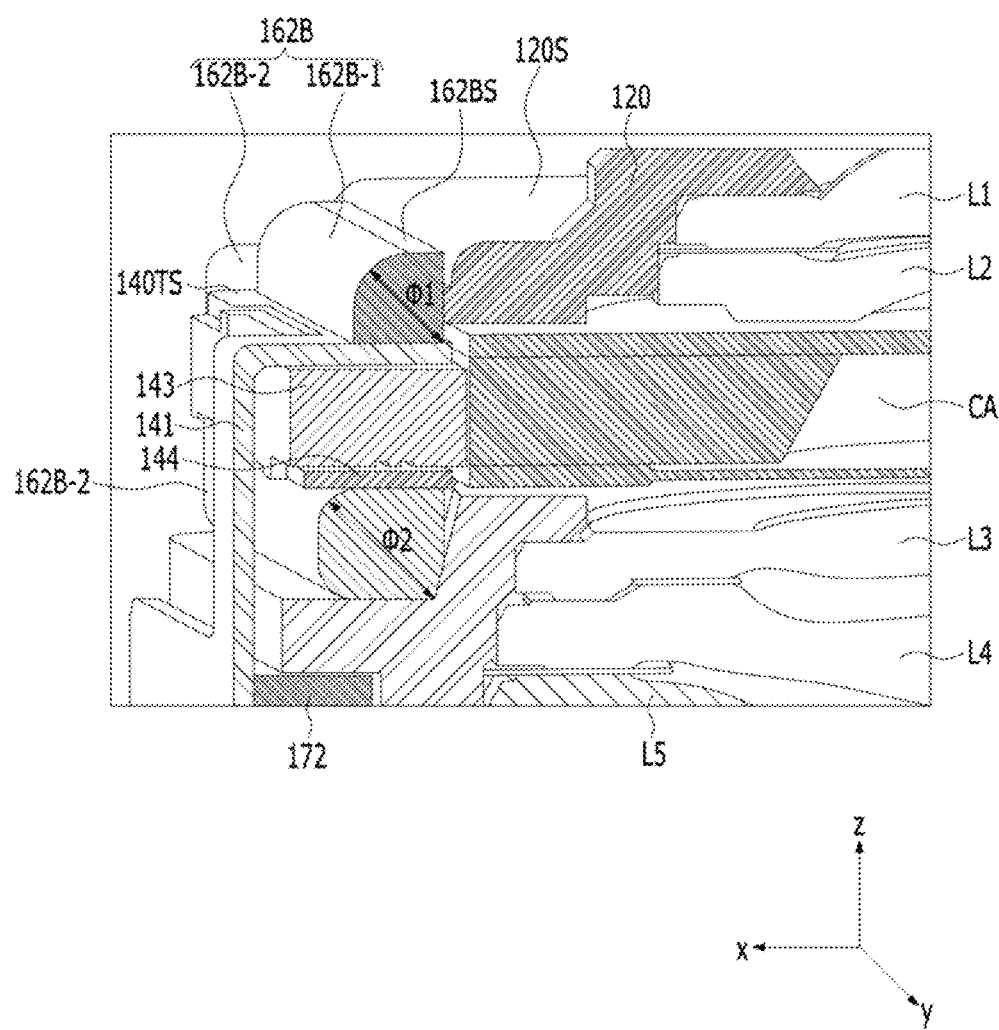

FIGS. 8a to 8c are respectively a cross-sectional view, a side view, and a perspective view of the camera module 100B illustrated in FIG. 7. That is, FIG. 8a is a cross-sectional view taken along line B-B' illustrating the camera module 100B of FIG. 7, FIG. 8b is a cross-sectional view illustrating the camera module 100B of FIG. 7 viewed from the front side (i.e. in the x-axis direction), and FIG. 8c is a partially enlarged perspective view of portion "C" illustrated in FIG. 8a. For convenience of description, the third adhesive member 166, the first cover 170, the circuit cover 154, and the connector 153 illustrated in FIG. 7 are omitted in FIG. 8a, and may be omitted from the camera module 100B in practice.

Referring to FIGS. 7 to 8c, the lens assembly may include at least one of the liquid lens unit 140, the holder 120, the first lens unit 110 or 110A, the second lens unit 130 or 130A, the third adhesive member 166, the fourth adhesive member 162B, or the fifth adhesive member 164B, and may correspond to the lens assembly 22B illustrated in FIG. 6. The lens assembly may be disposed on the main board 150.

Figure 9A:
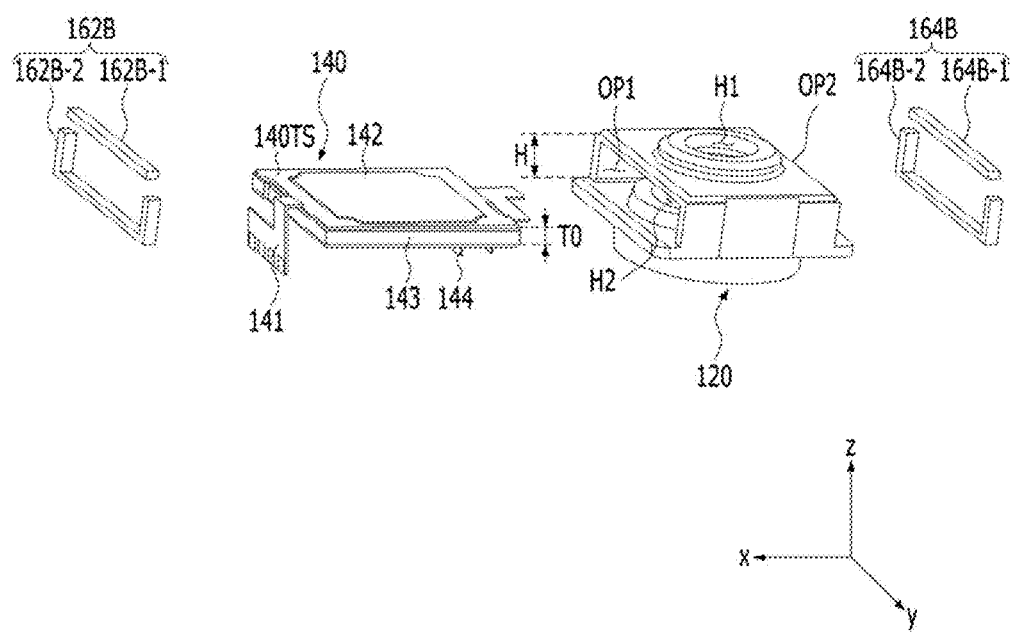
FIGS. 9a to 9c are views for explaining the holder, the liquid lens unit, a fourth adhesive member, and a fifth adhesive member as illustrated in FIGS. 7 to 8c.
Figure 9B:
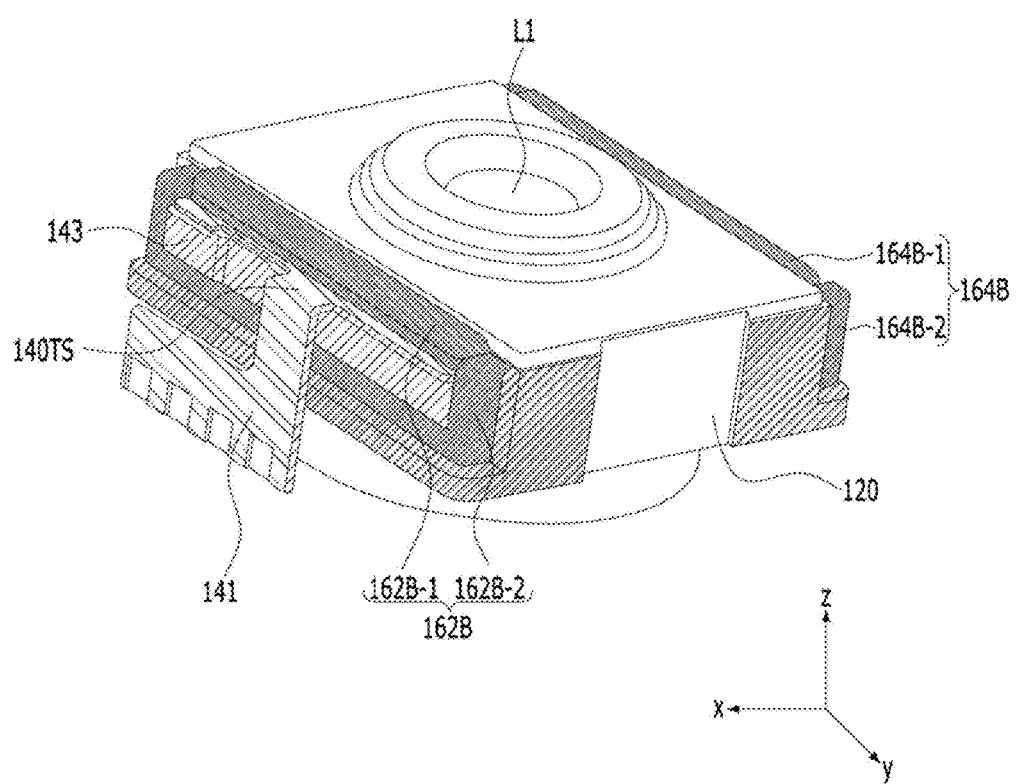
Figure 9C:
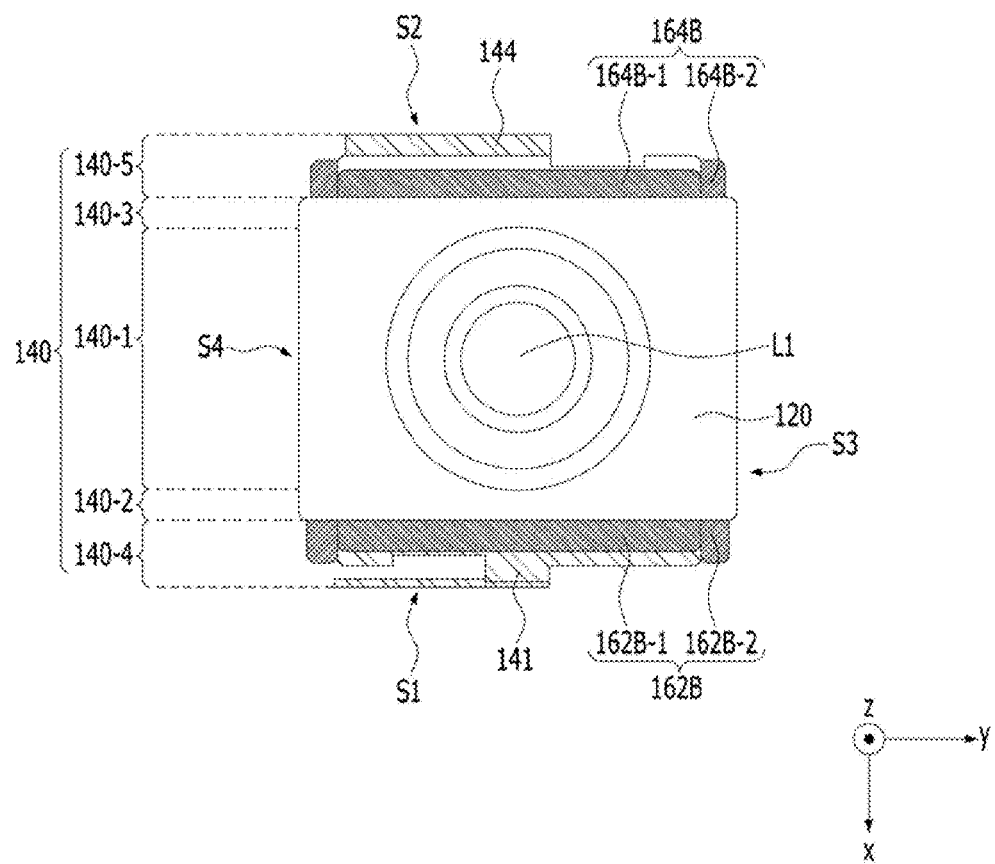

FIGS. 9a to 9c are views for describing the holder 120, the liquid lens unit 140, the fourth adhesive member 162B, and the fifth adhesive member 164B illustrated in FIGS. 7 to 8c. FIG. 9a is an exploded perspective view of the holder 120, the liquid lens unit 140, the fourth adhesive member 162B, and the fifth adhesive member 164B. FIG. 9b is an assembled perspective view of the holder 120, the liquid lens unit 140, the fourth adhesive member 162B, and the fifth adhesive member 164B. FIG. 9c is an assembled plan view of the holder 120, the liquid lens unit 140, the fourth adhesive member 162B, and the fifth adhesive member 164B.

The holder 120 illustrated in FIGS. 9a to 9c may include the first and second holes H1 and H2 and the first to fourth sidewalls S1, S2, S3 and S4.

FIGS. 4a to 4c illustrate the state before the first connection substrate 141 and the second connection substrate 144 bend in the −z-axis direction, whereas FIGS. 9a to 9c illustrate the state after the first connection substrate 141 and the second connection substrate 144 bend in the −z-axis direction. Except for this, a description related to the first to fifth portions 140-1 to 140-5 illustrated in FIG. 4c may also be applied to the liquid lens unit 140 of the camera module 100B according to the present embodiment.

In addition, as illustrated in FIG. 8a or 8c, the spacer 143 may be disposed between the first connection substrate 141 and the second connection substrate 144, and may be disposed so as to protrude from at least one of the first or second opening OP1 or OP2 in the holder 120.

In addition, the spacer 143 may have a ring shape, and may be disposed so as to surround the side surface of the liquid lens 142. The top and the bottom of the spacer 143 may be uneven in order to increase the coupling force with the connection substrates 141 and 144 via an adhesive material. The connection substrate 141 and 144 may have a shape corresponding to the shape of the spacer 143, and may have a ring shape.

In addition, in the same manner as the illustration of FIG. 3a, the liquid lens unit 140 illustrated in FIG. 8a may include the first to fifth areas A1, A2, A3, A4 and A5. The first area A1, the second area A2, the third area A3, the fourth area A4, and the fifth area A5 illustrated in FIG. 8a respectively correspond to the first portion 140-1, the second portion 140-2, the third portion 140-3, the fourth portion 140-4, and the fifth portion 140-5 illustrated in FIG. 9c. The first to fifth areas A1 to A5 are respectively the same as the first to fifth areas A1 to A5 illustrated in FIG. 3a, and thus a repeated description thereof is omitted.

In the case of the camera module 100A according to the embodiment illustrated in FIG. 3a, the first adhesive member 162A is disposed on the first area A1 (i.e. the second portion 140-2) of the liquid lens unit 140, and the second adhesive member 164A is disposed on the second area A2 (i.e. the third portion 140-3). On the other hand, in the case of the camera module 100B according to the embodiment illustrated in FIG. 8a, no adhesive member may be disposed on the first and second areas A1 and A2. On the other hand, in the case of the camera module 100B according to the present embodiment, the fourth adhesive member 162B is disposed on the fourth area A4 (i.e. the fourth portion 140-4), and the fifth adhesive member 164B is disposed on the fifth area (i.e. the fifth portion 140-5). In addition, an adhesive may be disposed on the first and second areas A1 and A2 as well as the fourth area A4 and the fifth area A5.

In addition, the fourth adhesive member 162B may include first and second adhesive portions 162B-1 and 162B-2, and the fifth adhesive member 164B may include third and fourth adhesive portions 164B-1 and 164B-2. These adhesive portions may include an adhesive, epoxy, or the like.

Referring to FIGS. 8a to 8c and FIGS. 9b and 9c, the first adhesive portion 162B-1 couples the holder 120 and a upper surface 140TS of the fourth area A4 of the liquid lens unit 140 to each other, and the third adhesive portion 164B-1 couples the holder 120 and the upper surface of the fifth area A5 of the liquid lens unit 140 to each other. Here, the upper surface 140TS of each of the fourth and fifth areas A4 and A5 of the liquid lens unit 140 is illustrated as being the upper surface of the first connection substrate 141, but the embodiment is not limited thereto. For example, when the liquid lens unit 140 does not include the connection substrates 141 and 144 or the spacer 143, the top of the liquid lens unit 140 may be the upper surface of the liquid lens unit 142.

In addition, referring to FIG. 8a, the holder 120 may include the holder upper area disposed above the liquid lens unit 140 (or the liquid lens 142) and the holder lower area disposed below the liquid lens unit 140 (or the liquid lens 142). In addition, the holder 120 may include a sidewall that faces the side surface of the liquid lens 142 or the liquid lens unit 140. Each of the first and third adhesive portions 162B-1 and 164B-1 couples the holder upper area 120U and the liquid lens unit 140 to each other. As such, each of the first and third adhesive portions 162B-1 and 164B-1 may couple the holder 120 and the liquid lens unit 140 to each other so that the liquid lens unit 140 may be fixed to the holder 120.

In addition, referring to FIG. 8b, the second adhesive portion 162B-2 may couple the holder 120 and the lower surface 140BS and the side surface 140SS of the fourth area A4 of the liquid lens unit 140 to each other. Here, the lower surface 140BS of the liquid lens unit 140 is illustrated as being the lower surface of the second connection substrate 144, and the side surface 140SS of the liquid lens unit 140 is illustrated as being the side surface of the spacer 143, but the embodiment is not limited thereto. For example, when the liquid lens unit 140 does not include the connection substrates 141 and 144 or the spacer 143, the lower surface or the side surface of the liquid lens unit 140 may respectively be the lower surface or the side surface of the liquid lens 142. In the same manner, the fourth adhesive portion 164B-2 may couple the holder 120 and the lower surface 140BS and the side surface 140SS of the fifth area A5 of the liquid lens unit 140 to each other. Here, the lower surface 140BS of the liquid lens unit 140 may be the lower surface of the second connection substrate 144, and the side surface 140SS of the liquid lens unit 140 may be the side surface of the spacer 143, but the embodiment is not limited thereto. For example, when the liquid lens unit 140 does not include the connection substrates 141 and 144 or the spacer 143, the lower surface or the side surface of the liquid lens unit 140 may respectively be the lower surface or the side surface of the liquid lens 142.

In addition, referring to FIG. 8a, each of the second and fourth adhesive portions 162B-2 and 164B-2 couples the holder lower area 120D and the liquid lens unit 140 to each other. As such, when each of the second and fourth adhesive portions 162B-2 and 164B-2 couples the holder 120 and the liquid lens unit 140 to each other, the first and second openings OP1 and OP2 may be sealed. The first adhesive portion 162B-1 and the second adhesive portion 164B-1 may be connected to each other in order to hermetically seal the first opening OP1, and the third adhesive portion 164B-1 and the fourth adhesive portion 164B-2 may be connected to each other in order to hermetically seal the second opening OP2.

Although not illustrated, even in the case of the camera module 100B, as illustrated in FIG. 4d, the third adhesive member 166 may be disposed so as to fill the space (or the gap) SP between the upper surface of the holder 120 and the first cover 170. In some cases, the third adhesive member 166 may be omitted. In this case, the space SP between the upper surface of the holder 120 and the first cover 170 may be empty.

The embodiment is not limited as to the shape of the third to fifth adhesive members 166, 162B and 164B described above. That is, the third, the fourth, and the fifth adhesive members 166, 162B and 164B may have various shapes so long as they seal the inside of the holder 120 in order to inhibit foreign substances from being introduced into the holder 120 through at least one of the first or second opening OP1 or OP2 from the outside. As described above, when the third adhesive member 166 is disposed so as to fill the space SP between the upper surface of the holder 120 and the first cover 170 in the state in which the fourth and fifth adhesive members 162B and 164B are disposed so as to hermetically seal the first and second openings OP1 and OP2 respectively, the third area A3 (i.e. the first portion 140-1) of the liquid lens unit 140, which is disposed in the inner space of the holder 120, may be sealed from the outside.

When foreign substances are introduced into the third area (i.e. the first portion 140-1) of the liquid lens unit 140, which is disposed inside the holder 120, through the first and second openings OP1 and OP2 or the space SP, the optical performance of the camera module 100B may be deteriorated, or a defective production may increase. However, since the inner space of the holder 120 in which the first portion 140-1 of the liquid lens unit 140 is disposed is sealed using the fourth adhesive member 162B, the fifth adhesive member 164B, and the third adhesive member 166, the camera module 100B according to the present embodiment may inhibit foreign substances from being introduced into the first portion 140-1 of the liquid lens unit 140 from an outside, whereby the optical performance of the camera module 100B may be improved and a defective proportion may decrease.

In addition, referring to FIGS. 7, 8b, and 9a to 9c, since each of the first opening OP1 and the second opening OP2 has a "⊔"-shaped form, each of the first adhesive portion 162B-1 and the third adhesive portion 164B-1 may have a "I"-shaped or "l"-shaped form and each of the second adhesive portion 162B-2 and the fourth adhesive portion 164B-2 may have a "U"-shaped form, but the embodiment is not limited thereto. Each of the first adhesive portion 162B-1, the second adhesive portion 162B-2, the third adhesive portion 164B-1, and the fourth adhesive portion 164B-2 may have a shape corresponding to the shape of each of the first and second openings OP1 and OP2.

In addition, referring to FIG. 8c, the cross-sectional area of the first adhesive portion 162B-1 may be smaller than the cross-sectional area of the second adhesive portion 162B-2. The maximum cross-sectional area of the first adhesive portion 162B-1 may be smaller than the maximum cross-sectional area of the second adhesive portion 162B-2. The cross-sectional area of the first adhesive portion 162B-1 may be smaller than the cross-sectional area of the second adhesive portion 162B-2 in the direction overlapping a virtual plane including the optical axis LX. In FIG. 8c, in the plane including the x-axis and the z-axis, the cross-sectional area of the first adhesive portion 162B-1 may be smaller than the cross-sectional area of the second adhesive portion 162B-2. In addition, the maximum value of the diameter Ø1 of the first adhesive portion 162B-1 may be smaller than the maximum value of the diameter Ø2 of the second adhesive portion 162B-2. In the same manner, the maximum value of the diameter Ø3 of the third adhesive portion 164B-1 may be smaller than the maximum value of the diameter Ø4 of the fourth adhesive portion 164B-2, but the embodiment is not limited thereto. The first to fourth adhesive portions 162B-1, 162B-2, 164B-1 and 164B-2 are not limited to a specific shape or size so long as the first and third adhesive portions 162B-1 and 164B-1 may fix the liquid lens unit 140 to the holder 120 and the second and fourth adhesive portions 162B-2 and 164B-2 may be disposed so as to hermetically seal the first and second openings OP1 and OP2 in cooperation with the first and third adhesive portions 162B-1 and 164B-1.

In addition, when the first cover 170 is disposed so as to surround the holder 120, the liquid lens unit 140, the middle base 172, and the sensor base 178, the first cover 170 may be in contact with the shoulder side upper surface 120S of the holder 120. In this embodiment, when the upper surface 162BS of each of the first adhesive portion 162B-1 and the third adhesive portion 164B-1 is located higher than the shoulder side upper surface 120S of the holder 120, the first cover 170 may be in contact with the upper surface 162BS of each of the first adhesive portion 162B-1 and the third adhesive portion 164B-1, instead of the shoulder side upper surface 120S of the holder 120. To firmly adhere the first cover 170 to the holder 120, as illustrated in FIGS. 8a to 8c, the upper surface 120S of the holder 120 may be located higher than the upper surface 162BS of the first adhesive portion 162B-1 by a first height h1. In the same manner, the upper surface 120S of the holder 120 may be located higher than the upper surface 164BS of the third adhesive portion 164B-1 by a second height h2.

Alternatively, the height of the upper surface 120S of the holder 120 and the height of the upper surface 162BS of the first adhesive portion 162B-1 may be the same (i.e. h1=0), and the height of the upper surface 120S of the holder 120 and the height of the upper surface 164BS of the third adhesive portion 164B-1 may be the same (i.e. h2=0).

In the above description, the liquid lens unit 140, mentioned when describing the features of the first, second, fourth, and fifth adhesive members 162A, 164A, 162B and 164B, includes the first and second connection substrates 141 and 144. However, in other embodiments, the liquid lens unit 140, mentioned when describing the features of the first, second, fourth, and fifth adhesive members 162A, 164A, 162B and 164B, may not include the first and second connection substrates 141 and 144.

In order to avoid some of circuit elements 151 illustrated in FIG. 7 from causing electromagnetic interference (EMI) or noise, for example inhibiting a power inductor 151-1 from causing greater EMI than other elements, the circuit cover 154 may be disposed so as to cover the circuit elements 151 disposed on the element area of the main board 150.

In addition, in the same manner as the second cover 174, when the circuit cover 154 is disposed so as to cover the circuit elements 151, the circuit elements 151 disposed on the top of the main board 150 may be protected from external shocks. To this end, the circuit cover 154 may include an accommodating space for accommodating therein and covering the circuit elements 151, in consideration of the shape and position of the circuit elements 151 disposed on the main board 150.

Meanwhile, the filter 176 may filter light within a specific wavelength range, with respect to the light that has passed through the first lens unit 110 or 110A, the liquid lens unit 140, and the second lens unit 130 or 130A. The filter 176 may be an infrared (IR) light blocking filter or an ultraviolet (UV) light blocking filter, but the embodiment is not limited thereto. The filter 176 may be disposed above the image sensor 182. The filter 176 may be disposed inside the sensor base 178. For example, the filter 176 may be disposed or mounted in an inner recess in the sensor base 178 or on a stepped portion thereof.

The sensor base 178 may be disposed below the middle base 172, and may be attached to the main board 150. The sensor base 178 may surround the image sensor 182, and may protect the image sensor 182 from foreign substances or shocks.

The main board 150 may be disposed below the sensor base 178. The sensor base 178 may be mounted on the main board 150 so as to be spaced apart from the circuit elements 151, and the middle base 172 and the holder 120 in which the second lens unit 130 or 130A, the liquid lens unit 140, and the first lens unit 110 or 110A are disposed may be disposed above the sensor base 178.

In addition, in certain embodiments, the camera module 100B illustrated in FIG. 7 may not include the sensor base 178 and the filter 176, in the same manner as the camera module 100A illustrated in FIG. 2.

Hereinafter, a method of manufacturing the camera module 100B according to the above-described embodiment is described.

According to the embodiment, the holder 120 is disposed and fixed. Subsequently, the liquid lens unit 140 is inserted through the first or second opening OP1 or OP2 in the holder 120. Subsequently, the holder 120 is located above the image sensor 182. Thereafter, in the state in which an equipment gripper grips the spacer 143 of the liquid lens unit 140 or grips the liquid lens unit 142 when the spacer 143 is omitted, a voltage is applied to the first and second connection substrates 141 and 144. Thereafter, active alignment (fifth alignment) is performed to adjust relative positions between the first lens unit 110 or 110A and the second lens unit 130 or 130A, which are fixed and mounted to the holder 120, and the liquid lens unit 140, while adjusting the position of the liquid lens unit 140. After fifth alignment is performed as described above, a first adhesive is applied to an area of the liquid lens unit 140 and the holder 120, to which the first and third adhesive portions 162B-1 and 164B-1 are to be formed, and is then subjected to UV pre-curing and thermal curing (i.e. main curing), whereby the first and third adhesive portions 162B-1 and 164B-1 are completed. The second and fourth adhesive portions 162B-2 and 164B-2 may be formed via adhesive application and UV curing after the thermal curing of the first and third adhesive portions 162B-1 and 164B-1, but may be omitted in this step. In certain embodiments, the formation of the second and fourth adhesive portions 162B-2 and 164B-2 may be performed after the alignment of the holder and the lens assembly, which is described below.

Once the above-described fifth alignment has been performed, the holder 120 and the middle base 172 are coupled to each other. The holder 120 and the middle base 172 may be coupled to each other in advance before this step. Subsequently, dual epoxy is applied to the sensor base 178. Subsequently, the holder 120 is located on the image sensor 182 and the main board 150 in the state in which the gripper grips the middle base 172. Subsequently, after a voltage is applied, active alignment (sixth alignment) is performed to adjust relative positions between the lens units of the lens assembly and the image sensor 182 while changing the position of the holder 120, and UV curing and thermal curing are performed. After sixth alignment is performed as described above, a second adhesive is applied to an area of the liquid lens unit 140 and the holder 120, to which the second and fourth adhesive portions 162B-2 and 164B-2 are to be disposed, and is then subjected to LW curing, whereby the second and fourth adhesive portions 162B-2 and 164B-2 are completed. Alternatively, after the first and third adhesive portions 162B-1 and 164B-1 are completed, the second adhesive may be applied to complete the second and fourth adhesive portions 162B-2 and 164B-2 before the above-described sixth alignment is performed. UV curing and thermal curing may be performed in case that the first and third adhesive portions 162B-1 and 164B-1 may be used for alignment and firm position fixing, whereas only UV curing may be performed in case that the second and fourth adhesive portions 162B-2 and 164B-2 may be used for sealing.

According to another embodiment, the image sensor 182 may be mounted on the main board 150, and the sensor base 178 coupled to the filter 176 may be coupled to the main board 150. Thereafter, instead of the liquid lens unit 140, master glass may be inserted into the holder 120 coupled to the middle base 172 through the first or second opening OP1 or OP2, and thereafter, active alignment (seventh alignment) may be performed to adjust relative positions between the first and second lens units disposed inside the holder 120 and the image sensor 182 disposed on the main board 150. Seventh alignment may be performed while moving a jig, which supports and fixes opposite sides of the middle base 172. In the completed state of seventh alignment, the middle base 172 or the holder 120 may be coupled to the sensor base 178. When the sensor base 178 is omitted, the middle base 172 or the holder 120 may be coupled to the main board 150.

Subsequently, instead of the master glass, the liquid lens unit 140 may be inserted into the holder 120 through the first or second opening OP1 or OP2, and thereafter, active alignment (eighth alignment) may be performed to adjust relative positions between the liquid lens unit 140 and the image sensor 182. Eighth alignment may be performed by adjusting the position of the liquid lens unit 140 while supporting the liquid lens unit 140 in the x-axis direction. For example, eighth alignment may be performed by adjusting the position of the liquid lens unit 140 while supporting, in the x-axis direction, the spacer 143 of the liquid lens unit 140 or supporting the liquid lens 142 when the spacer 143 is omitted. In addition, eighth alignment may be performed while moving a jig, which supports the liquid lens unit 140 in the x-axis direction. At this time, the first and third adhesive portions 162B-1 and 164B-1 and the second and fourth adhesive portions 162B-2 and 164B-2 may be formed after seventh alignment is completed and before eighth alignment is performed. Alternatively, the first and third adhesive portions 162B-1 and 164B-1 may be formed after seventh alignment is completed and before eighth alignment is performed, and the second and fourth adhesive portions 162B-2 and 164B-2 may be formed after eighth alignment is performed.

Subsequently, each of the first connection substrate 141 and the second connection substrate 144 may be subjected to bending so as to be electrically connected to the main board 150. After the bending process, a soldering process may be performed for electrical connection between each of the first connection substrate 141 and the second connection substrate 144 and the main board 150.

Subsequently, the first lens unit 110, the holder 120, the second lens unit 130, the liquid lens unit 140, the middle base 172, and the sensor base 178 are covered with the first cover 170 so as to complete the camera module 100B.

The first and second adhesives described above may include a silicon-based material, a sealing material, or an optically curable adhesive material, and the embodiment is not limited to a specific material of the first and second adhesives.

The first adhesive portion 162B-1 and the second adhesive portion 162B-2 may include the same material, or may include different materials. In addition, the third adhesive portion 164B-1 and the fourth adhesive portion 164B-2 may include the same material, or may include different materials.

The spacer 143 is gripped by the gripper when the first adhesive is applied after the above-described fifth or eighth alignment is performed. Thus, even if the contraction rate of the first adhesive is large, the first and second lens units 110 and 130 disposed inside the holder 120 are not pulled toward the liquid lens unit 140. However, when the second adhesive is applied after sixth or seventh alignment is performed, the first and second lens units disposed inside the holder 120 may be pulled toward the liquid lens unit 140. To inhibit this, the contraction rate of the second adhesive may be less than the contraction rate of the first adhesive. For example, upon the curing of the second adhesive for the manufacture of the second or fourth adhesive portion 162B-2 or 164B-2, the contraction rate of the second adhesive may be 1% or less, but the embodiment is not limited thereto. Thus, the contraction rate of the second adhesive portion 162B-2 may be less than the contraction rate of the first adhesive portion 162B-1, and the contraction rate of the fourth adhesive portion 164B-2 may be less than the contraction rate of the third adhesive portion 164B-1.

In addition, the first adhesive may be applied in the −z-axis direction, and the second adhesive may be applied in the −x-axis direction. At this time, in order to inhibit the second adhesive from being introduced into the holder 120 through the first and second openings OP1 and OP2 when the second adhesive is applied, the second adhesive may have suitable viscosity.

The liquid lens unit 140 may include the liquid lens 142. The liquid lens unit 140 may further include the connection substrates 141 and 144 and/or the spacer 143. It is noted that in certain embodiments, the liquid lens unit 140 does not include at least one of the connection substrates 141 and 144 or the spacer 143.

Hereinafter, various embodiments 140A to 140I of the liquid lens unit 140 included in the camera module 100A according to the above-described embodiment is described with reference to FIGS. 10a to 10i. When an optical layer 190 is omitted from the liquid lens units 140A to 140I illustrated in FIGS. 10a to 10i, the liquid lens units illustrated in FIGS. 10a to 10i may correspond to the liquid lens unit 140 included in the camera module 100B according to the above-described embodiment.

FIGS. 10a to 10i are cross-sectional views illustrating the embodiments 140A to 140I of the liquid lens unit 140 including the liquid lens according to the embodiment described above.

Each of the liquid lens units 140A to 140I illustrated in FIGS. 10a to 10i may include the first connection substrate 141, the liquid lens 142, the spacer 143, and the second connection substrate 144. The spacer 143 has been described above, and thus a repeated description thereof is omitted. For convenience of description, the illustration of the spacer 143 is omitted in FIGS. 10a to 10i.

The liquid lens 142 may include a plurality of different types of liquids LQ1 and LQ2, first to third plates 147, 145 and 146, first and second electrodes E1 and E2, and an insulation layer 148. The liquid lens 142 may further include the optical layer 190 or 190A to 190I.

The liquids LQ1 and LQ2 may be accommodated in the cavity CA, and may include a first liquid LQ1, which is conductive, and a second liquid (or insulative liquid) LQ2, which is non-conductive. The first liquid LQ1 and the second liquid LQ2 may be separated from each other, and an interface BQ may be formed on a contact portion between the first and second liquids LQ1 and LQ2. For example, the second liquid LQ2 may be disposed above the first liquid LQ1, but the embodiment is not limited thereto.

In addition, in the cross-sectional shape of the liquid lens 142, the edge of the first and second liquids LQ2 and LQ1 may be thinner than the center portion.

The first liquid LQ1 may be formed by mixing, for example, ethylene glycol and sodium bromide (NaBr) with each other. The second liquid LQ2 may be oil, and for example, may be phenyl-based silicon oil.

Each of the first liquid LQ1 and the second liquid LQ2 may include at least one of a sterilizer or an antioxidant. The antioxidant may be a phenyl based antioxidant or a phosphorus (P) based antioxidant. In addition, the sterilizer may be any one of alcohol-based, aldehyde-based, and phenol-based sterilizers. When each of the first liquid LQ1 and the second liquid LQ2 includes the antioxidant and the sterilizer, it is possible to inhibit a change in the physical properties of the first and second liquids LQ1 and LQ2 due to oxidation of the first and second liquids LQ1 and LQ2 or the propagation of microorganisms in the first and second liquids LQ1 and LQ2.

The inner side surface of the first plate 147 may form a sidewall i of the cavity CA. The first plate 147 may include upper and lower openings having a predetermined inclined surface. The cavity CA may be defined as an area that is surrounded by the inclined surface of the first plate 147, a third opening in contact with the second plate 145, and a fourth opening in contact with the third plate 146.

The diameter of a wider opening among the third and fourth openings may be changed depending on the field of view (FOV) required for the liquid lens 142 or the role of the liquid lens 142 in the camera module 100A. According to certain embodiments, the size (or the area or the width) of the third opening $O_1$ may be smaller than the size (or the area or the width) of the fourth opening $O_2$. Here, the size of each of the third and fourth openings may be the cross-sectional area in the horizontal direction (e.g. the x-axis direction and the y-axis direction). For example, the size of each of the third and fourth openings may be the radius when the opening has a circular cross-section, and may be the diagonal length when the opening has a square cross-section.

Each of the third and fourth openings may take the form of a hole having a circular cross section, and the inclined surface thereof may have an inclination angle ranging from 55 degrees to 65 degrees or an inclination angle ranging from 50 degrees to 70 degrees. The interface BO formed by the two liquids may be moved along the inclined surface of the cavity CA by a drive voltage.

The first liquid LQ1 and the second liquid LQ2 fills, or is accommodated or disposed in the cavity CA of the first plate 147. In addition, the cavity CA is the area through which the light that has passed through the first lens unit 110 or 110A passes. Thus, the first plate 147 may be formed of a transparent material, and may include a dopant that may inhibit easy light transmission.

The electrodes may be disposed respectively on one surface and the other surface of the first plate 147. A plurality of first electrodes E1 may be disposed on one surface (e.g. the upper surface, the side surface, or the lower surface) of the first plate 147 so as to be spaced apart from the second electrode E2. The second electrode E2 may be disposed on at least an area of the other surface (e.g. the lower surface) of the first plate 147 and may be in direct contact with the first liquid LQ1.

In addition, the first electrodes E1 may be "n" electrodes (hereinafter, "individual electrodes"), and the second electrode E2 may be a single electrode (hereinafter, "common electrode"). Here, "n" may be an integer of 2 or more.

Each of the first and second electrodes E1 and E2 may include at least one electrode sector. For example, the first electrode E1 may include two or more electrode sectors, and the second electrode E2 may include at least one electrode sector. For example, the plurality of first electrodes E1 may include a plurality of electrode sectors sequentially disposed in the clockwise direction (or in the counterclockwise direction) about the optical axis. Here, the electrode sector means a portion of the electrode.

A portion of the second electrode E2 (i.e. an electrode sector of the second electrode E2) disposed on the other surface of the first plate 147 may be exposed to the first liquid LQ1, which is conductive.

Each of the first and second electrodes E1 and E2 may be formed of a conductive material, and for example, may be formed of a metal, specifically, chrome (Cr). Chromium or chrome is a silvery, lustrous, and hard transition metal that is fragile, is not readily discolored, and has a high melting point. In addition, a chromium alloy may be used in the form of an alloy with other metals because it is highly resistant to corrosion and is hard. In particular, chromium(Cr) is highly resistant to the first conductive liquid LQ1 filling the cavity CA because it is less corrosive and readily discolored.

In addition, the second plate 145 may be disposed on one surface of the first electrodes E1. That is, the second plate 145 may be disposed above the first plate 147. Specifically, the second plate 145 may be disposed above the upper surface of the first electrodes E1 and the cavity CA.

The third plate 146 may be disposed on one surface of the second electrode E2. That is, the third plate 146 may be disposed below the first plate 147. Specifically, the third plate 146 may be disposed below the lower surface of the second electrode E2 and the cavity CA.

The second plate 145 and the third plate 146 may be disposed so as to face each other with the first plate 147 interposed therebetween. In addition, at least one of the second plate 145 or the third plate 146 may be omitted.

At least one of the second or third plate 145 or 146 may have a square planar shape. The third plate 146 may be brought into contact with and bonded to the first plate 147 on a bonding area thereof around the edge.

Each of the second and third plates 145 and 146 may be an area through which light passes, and may be formed of a light-transmitting material. For example, each of the second and third plates 145 and 146 may be formed of glass, and for the convenience of the process, may be formed of the same material. In addition, the edge of each of the second and third plates 145 and 146 may have a square shape, without being necessarily limited thereto.

The second plate 145 may be configured so as to allow the light introduced into the first lens unit 110 or 110A to progress into the cavity CA in the first plate 147.

The third plate 146 may be configured so as to allow the light that has passed through the cavity CA in the first plate 147 to be directed to the second lens unit 130 or 130A. The third plate 146 may be in contact with the first liquid LQ1.

According to the embodiment, the third plate 146 may have a diameter greater than the diameter of a wider opening among the third and fourth openings in the first plate 147. In addition, the third plate 146 may include a peripheral area spaced apart from the first plate 147.

In addition, the actual effective lens area of the liquid lens 142 may be narrower than the diameter (e.g. $O_2$) of a wider opening among the third and fourth openings in the first plate 147. For example, when a region within a small radius about the center of the liquid lens 142 is used as an actual light transmission path, the diameter (e.g. $O_3$) of the center area of the third plate 146 may be smaller than the diameter (e.g. $O_2$) of a wider opening among the third and fourth openings in the first plate 147.

The insulation layer 148 may be disposed so as to cover a portion of the lower surface of the second plate 145 in the upper area of the cavity CA. The insulation layer 148 may be disposed between the second liquid LQ2 and the second plate 145.

In addition, the insulation layer 148 may be disposed so as to cover a portion of the first electrode E1, which forms the sidewall of the cavity CA. In addition, the insulation layer 148 may be disposed on the lower surface of the first plate 147 so as to cover a portion of the first electrode E1, the first plate 147, and the second electrode E2. Thus, contact between the first electrode E1 and the first liquid LQ1 and contact between the first electrode E1 and the second liquid LQ2 may be inhibited by the insulation layer 148.

The insulation layer 148 may be formed of, for example, a coating agent such as Parylene C, and may further include a white dye. The white dye may increase the frequency of reflection of light from the insulation layer 148, which forms the sidewall i of the cavity CA.

The insulation layer 148 may cover one electrode among the first and second electrodes E1 and E2 (e.g. the first electrode E1), and may expose a portion of the other electrode (e.g. the second electrode E2) so that electricity is applied to the first liquid LQ1 having conductivity.

Meanwhile, according to the embodiment, the optical layer 190 may be disposed on one surface of at least one of the second plate 145 or the third plate 146. For example, the optical layer 190 may be disposed on at least one of the upper side or the lower side of the second plate 145, may be disposed on at least one of the upper side or the lower side of the third plate 146, or may be disposed on at least one of the upper side or the lower side of each of the second and third plates 145 and 146.

In the case of FIGS. 2 and 7, the liquid lens 142 and the optical layer 190 are illustrated separately, but the optical layer 190 may be a component of the liquid lens 142. In addition, in the case of FIGS. 2 and 7, the optical layer 190 is illustrated as a single layer, this is merely given to display the presence of the optical layer 190. The optical layer 190 may be formed in a single layer as illustrated in FIGS. 10a, 10b, 10h and 10i, or may be formed in multiple layers as illustrated in FIGS. 10c to 10g.

The optical layer 190 may include at least one of an ultraviolet light blocking layer, an anti-reflection layer, or an infrared light blocking layer. The optical layer 190 may be disposed so as to overlap the image sensor 182 in the direction of the optical axis LX (i.e. the z-axis) or in the direction parallel to the optical-axis direction. In addition, the optical layer 190 may be disposed on the third area A3 (i.e. the first portion 140-1) of the liquid lens unit 140.

The ultraviolet light blocking layer may block ultraviolet light, more particularly, UV-A light. The ultraviolet light blocking layer may be disposed in the area in which light is introduced into the liquid lens 142, and may block ultraviolet light, more particularly, UV-A light, which may be transmitted to the first lens unit 110 or 110A. UV-C light has a relatively short wavelength, and thus low penetration force, and therefore most UV-C light is blocked by the ozone layer. UV-B light is blocked by general glass, but UV-A light passes through general glass, and therefore blocking thereof may particularly require a separate blocking layer.

The ultraviolet light blocking layer may include at least one of $TiO_2$, $SiO_2$, avobenzone, butylmethoxy dibenzoylmethane, oxybenzone, benzophenone-3, cinnamate, or Mexoryl.

In addition, the ultraviolet light blocking layer may be disposed in a single layer or in multiple layers, and this may be equally applied to the following embodiments, which are described below.

The anti-reflection layer may serve to inhibit the reflection of light from the second or third plate 145 or 146, and may reduce deterioration in light transmittance due to Fresnel loss in the liquid lens 142 and may also inhibit deterioration in the visibility of the liquid lens 142 at night.

In particular, although not illustrated, the anti-reflection layer may be disposed on the inclined surface and the lower surface of the insulation layer 148, and may serve to inhibit deterioration in the quality of light transmitted to the image sensor 182 due to the reflection of light.

The infrared light blocking layer may block infrared light.

At least one of the ultraviolet light blocking layer, the anti-reflection layer, or the infrared light blocking layer may be disposed on at least one of a light introduction portion or a light discharge portion of the camera module 100A according to the embodiment.

The ultraviolet light blocking layer may inhibit ultraviolet light from being introduced into the liquid lens 142 from the outside, may inhibit a composition of an adhesive layer or the like in the liquid lens 142 or the first and second liquids LQ1 and LQ2 from being spoiled by ultraviolet light, more particularly, UV-A light, and may inhibit deterioration in the light transmittance of the liquid lens 142.

The infrared light blocking layer may inhibit the generation of thermal spots in an image by inhibiting infrared light from being introduced into the liquid lens 142 from the outside, and may inhibit deterioration in visibility at night by reducing the reflection of light from the surface of the liquid lens 142.

According to the embodiment, the optical layer 190 may take the form of coating or a film. For example, the anti-reflection layer of the optical layer 190 may be coated by, for example, spraying at a low temperature.

In the case of the camera module 100B according to the above-described embodiment, the filter 176 for the blocking of ultraviolet light or infrared light is disposed between the middle base 172 and the image sensor 182, and filters light within a specific wavelength range, with respect to the light that has passed through the first lens unit 110, the liquid lens 142, and the second lens unit 130. In addition, such an infrared light blocking filter or an ultraviolet light blocking filter is mounted in a recess in the sensor base 178.

On the other hand, in the case of the camera module 100A according to the above-described embodiment, since the optical layer 190 is disposed on one surface of the second or third plate 145 or 146 in a coated form or a film form, the camera module 100A does not include the infrared light or ultraviolet light blocking filter 176 and the sensor base 178. Thus, the thickness of the camera module 100A according to the first described embodiment may be reduced compared to the camera module 100B including the infrared light or ultraviolet light blocking filter 176 and the sensor base 178. That is, the flange back length (FBL), which corresponds to the distance between the second lens unit 130 or 130A and the image sensor 182 along the optical axis LX, may be reduced, compared to the existing device. Thus, it is noted that the camera module 100B according to the second described embodiment may include the optical layer 190, instead of the filter 176 and the sensor base 178.

Hereinafter, various embodiments 190A to 190I of the optical layer 190 are described with reference to FIGS. 10a to 10i.

The liquid lenses 140A to 140I illustrated in FIGS. 10a to 10i have the same configuration, excluding the arranged form of the optical layer 190.

Figure 10A:
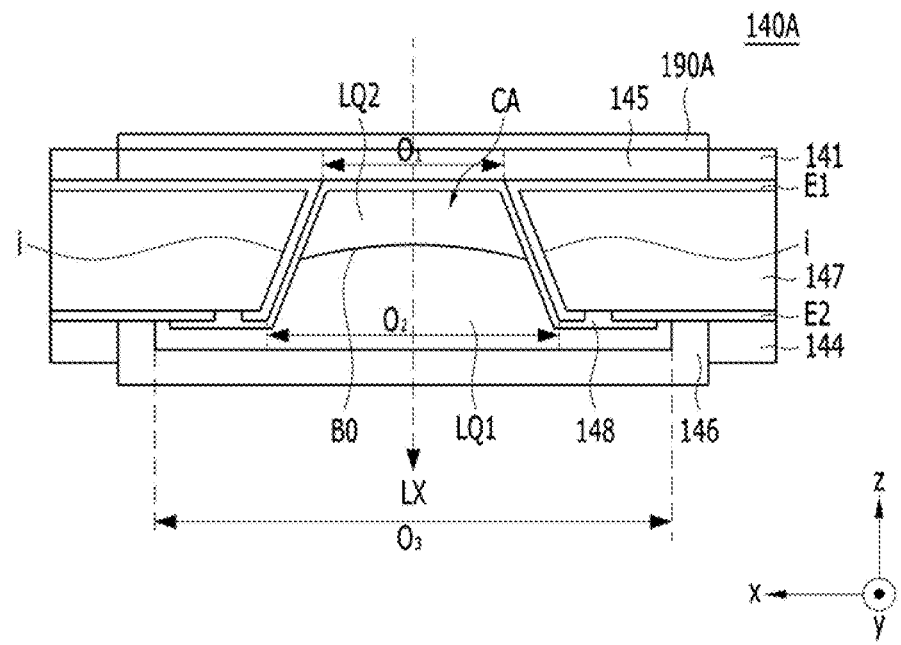
FIGS. 10a to 10i are cross-sectional views illustrating embodiments of a liquid lens unit including a liquid lens according to the embodiment described above.

According to one embodiment, as illustrated in FIG. 10a, the optical layer 190A may be disposed on the second plate 145. That is, the lower surface of the optical layer 190A may be in contact with the upper surface of the second plate 145. For example, the optical layer 190A may be an ultraviolet light blocking layer, an anti-reflection layer, or an infrared light blocking layer.

Figure 10B:
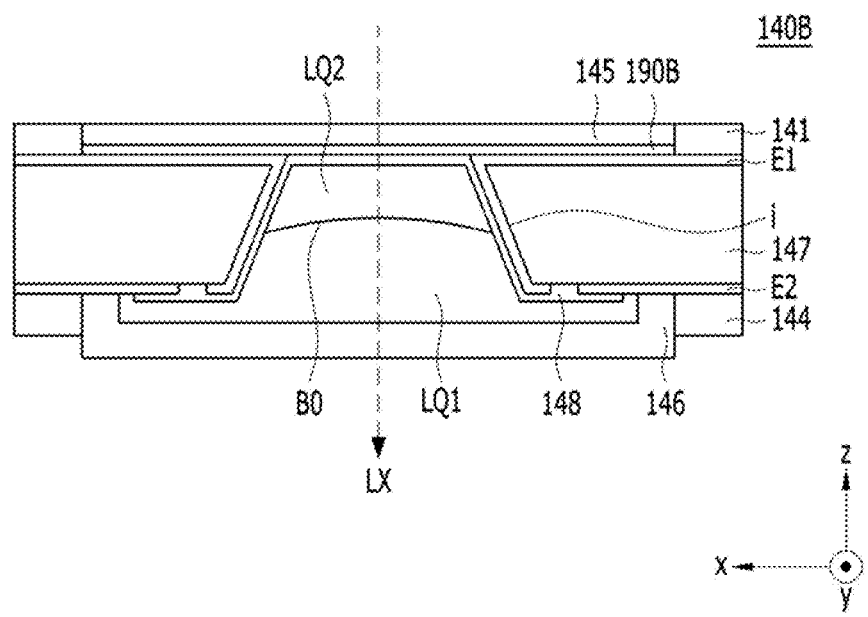

According to another embodiment, as illustrated in FIG. 10b, the optical layer 190B may be disposed between the second plate 145 and the insulation layer 148. That is, the upper surface of the optical layer 190B may be in contact with the lower surface of the second plate 145, the side surface thereof may be in contact with the first connection substrate 141, and the lower surface thereof may be in contact with the insulation layer 148 and the first electrode E1. For example, the optical layer 190B may be an ultraviolet light blocking layer, an anti-reflection layer, or an infrared light blocking layer.

Figure 10C:
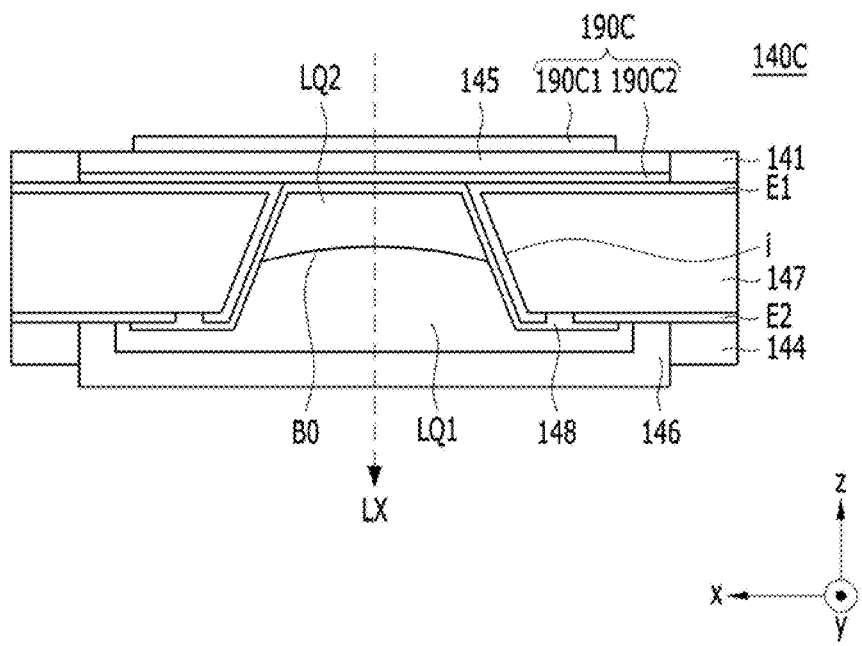

According to still another embodiment, as illustrated in FIG. 10c, the optical layer 190C may include a first optical layer 190C1 disposed on the upper surface of the second plate 145 and a second optical layer 190C2 disposed on the lower surface of the second plate 145. Unlike the optical layer 190A disposed on the entire upper surface of the second plate 145 illustrated in FIG. 10a, the first optical layer 190C1 is disposed on a partial area corresponding to the second liquid LQ2 and is not disposed on the edge area of the upper surface of the second plate 145, rather than being disposed on the entire upper surface of the second plate 145. The second optical layer 190C2 is disposed in the same form as the optical layer 190B illustrated in FIG. 10*b*, and thus a description thereof is omitted. For example, each of the first and second optical layers 190C1 and 190C2 may be an ultraviolet light blocking layer, an anti-reflection layer, or an infrared light blocking layer. For example, the first and second optical layers 190C1 and 190C2 may include two of an ultraviolet light blocking layer, an anti-reflection layer, and an infrared light blocking layer.

Figure 10D:
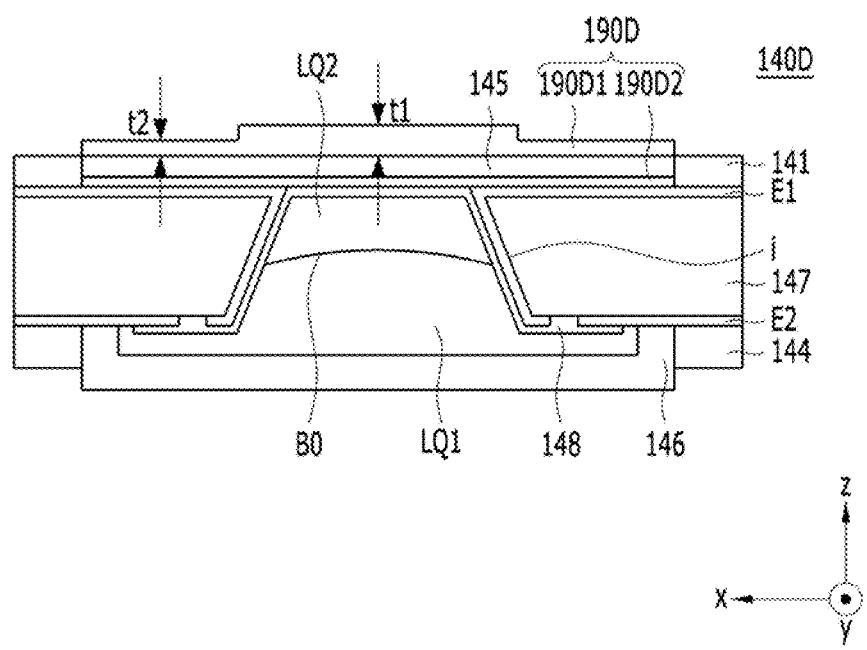

According to still another embodiment, as illustrated in FIG. 10*d*, the optical layer 190D may include a first optical layer 190D1 disposed on the upper surface of the second plate 145 and a second optical layer 190D2 disposed on the lower surface of the second plate 145. Unlike the optical layer 190A illustrated in FIG. 10*a*, the thickness t1 of the first optical layer 190D1 in the center area of the upper surface of the second plate 145 may be greater than the thickness t2 of the first optical layer in the edge area. For example, the first optical layer 190D1 may have a multilayered structure, and a greater number of first optical layers 190D1 may be provided in the peripheral area and the center area corresponding to the second liquid LQ2, compared to that in the edge area. For example, each of the first and second optical layers 190D1 and 190D2 may be an ultraviolet light blocking layer, an anti-reflection layer, or an infrared light blocking layer. For example, the first and second optical layers 190D1 and 190D2 may include two of an ultraviolet light blocking layer, an anti-reflection layer, and an infrared light blocking layer.

Figure 10E:
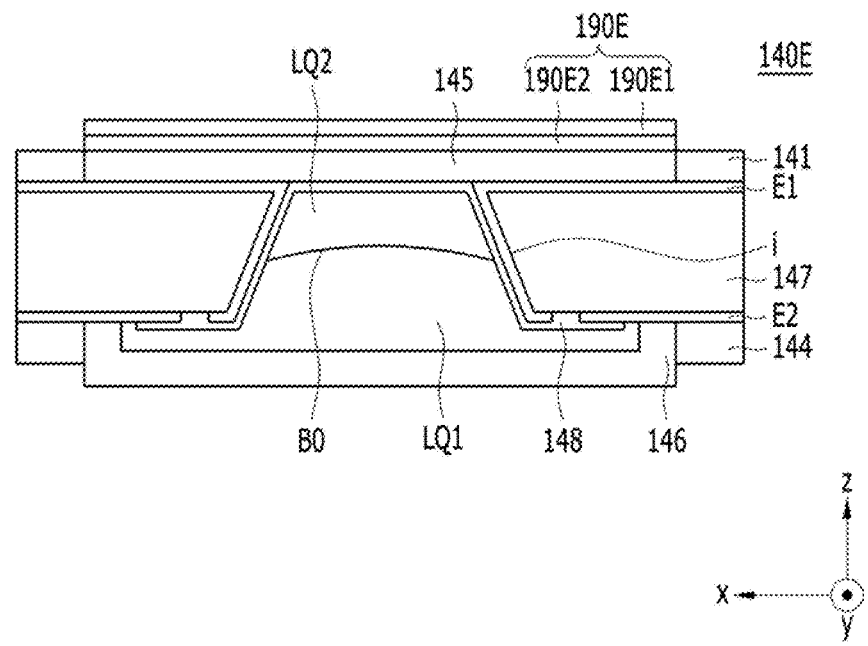

According to still another embodiment, as illustrated in FIG. 10*e*, the optical layer 190E may include a first optical layer 190E1 and a second optical layer 190E2. The first optical layer 190E1 may be disposed on the upper surface of the second plate 145, and the second optical layer 190E2 may be disposed between the upper surface of the second plate 145 and the first optical layer 190E 1. For example, each of the first and second optical layers 190E 1 and 190E2 may be an ultraviolet light blocking layer, an anti-reflection layer, or an infrared light blocking layer. For example, the first and second optical layers 190E1 and 190E2 may include two of an ultraviolet light blocking layer, an anti-reflection layer, and an infrared light blocking layer.

Figure 10F:
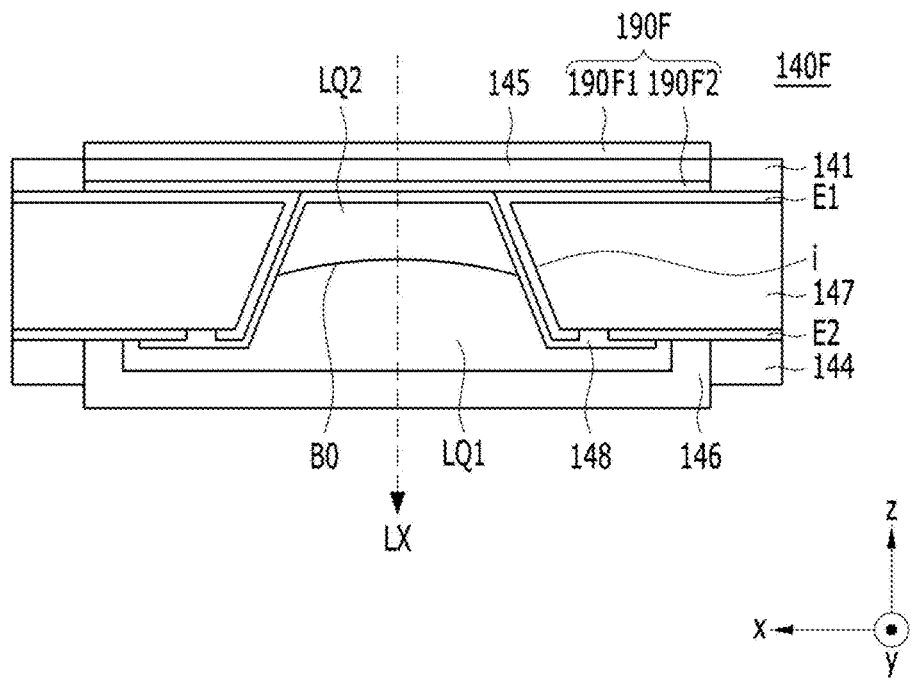

According to still another embodiment, as illustrated in FIG. 10*f*, the optical layer 190F may include a first optical layer 190F1 and a second optical layer 190F2. The first optical layer 190F1 may be disposed on the upper surface of the second plate 145, and the second optical layer 190F2 may be disposed on the lower surface of the second plate 145*1n* the same manner as the optical layer 190B illustrated in FIG. 10*b*, the upper surface of the second optical layer 190F2 may be in contact with the lower surface of the second plate 145, the side surface thereof may be in contact with the first connection substrate 141, and the lower surface thereof may be in contact with the insulation layer 148 and the first electrode E1. Each of the first and second optical layers 190F1 and 190F2 may be an ultraviolet light blocking layer, an anti-reflection layer, or an infrared light blocking layer. For example, the first and second optical layers 190F1 and 190F2 may include two of an ultraviolet light blocking layer, an anti-reflection layer, and an infrared light blocking layer.

Figure 10G:
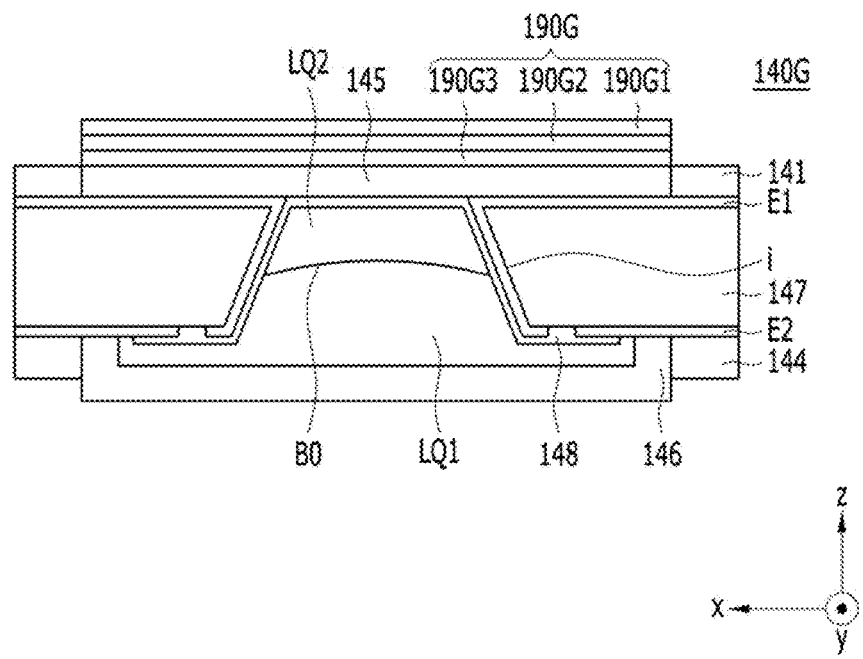

According to still another embodiment, as illustrated in FIG. 10*g*, the optical layer 190G may include a first optical layer 190G1, a second optical layer 190G2, and a third optical layer 190G3. The first optical layer 190G1 may be disposed on the upper surface of the second plate 145, the second optical layer 190G2 may be disposed between the upper surface of the second plate 145 and the first optical layer 190G1, and the third optical layer 190G3 may be disposed between the upper surface of the second plate 145 and the second optical layer 190G2. For example, each of the first, second and third optical layers 190G1, 190G2 and 190G3 may be an ultraviolet light blocking layer, an anti-reflection layer, or an infrared light blocking layer. For example, the first, second and third optical layers 190G1, 190G2 and 190G3 may include an ultraviolet light blocking layer, an anti-reflection layer, and an infrared light blocking layer.

Figure 10H:
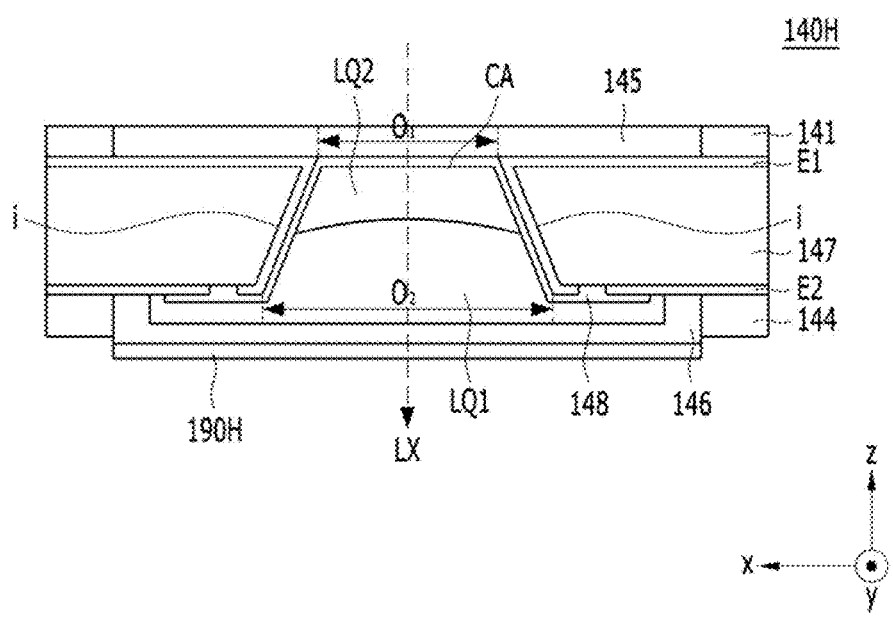

According to still another embodiment, as illustrated in FIG. 10*h*, the optical layer 190H may be disposed below the third plate 146. The upper surface of the optical layer 190H may be in contact with the lower surface of the third plate 146. For example, the optical layer 190H may be an ultraviolet light blocking layer, an anti-reflection layer, or an infrared light blocking layer.

Figure 10I:
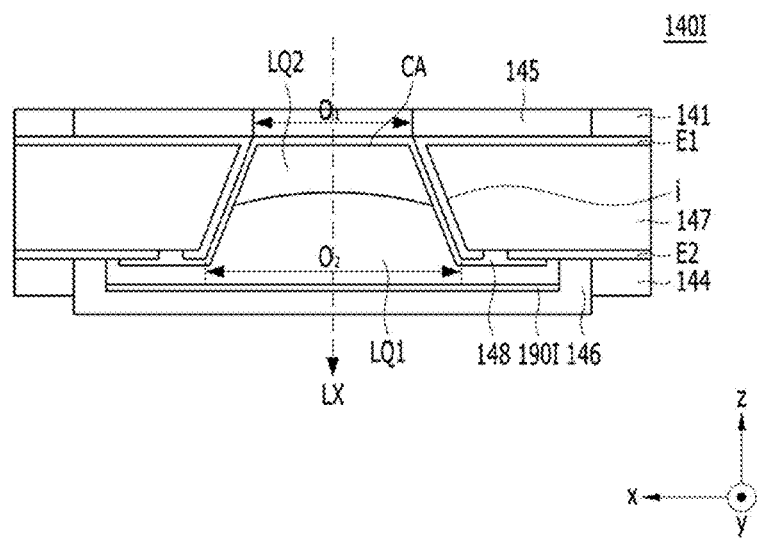

According to still another embodiment, as illustrated in FIG. 10*i*, the optical layer 190I may be disposed between the inner upper surface of the third plate 146 and the first liquid LQ1. The upper surface of the optical layer 190I may be in contact with the first liquid LQ1, the side surface of the optical layer 190I may be in contact with the inner side surface of the third plate 146, and the lower surface of the optical layer 190I may be in contact with the inner upper surface of the third plate 146.

For example, when the above-described optical layer 190 includes an anti-reflection layer and at least one of an infrared light blocking layer or an ultraviolet light blocking layer, the anti-reflection layer may be disposed on at least one of the infrared light blocking layer or the ultraviolet light blocking layer.

Meanwhile, each of the components 110 to 190 illustrated in FIGS. 1 to 5 and the components 110 to 176 illustrated in FIGS. 6 to 9*c* may be brought into contact with, or coupled, fixed, or bonded to each other via epoxy. To this end, when attempting to bring into contact with, couple, fix, or bond two components of the components 110 to 190 or the components 110 to 176, epoxy application, UV pre-curing, and thermal curing may be sequentially performed. In some embodiments, any one curing process may be omitted or another bonding process may be added, according to the material or properties of elements.

The camera module 100A according to the embodiment includes the optical layer 190 having a coated form or a film form, and therefore, does not include the infrared light or ultraviolet light blocking filter 176 and the sensor base 178. Thus, epoxy may be disposed between the second lens unit 130 or 130A and the image sensor 182, and may be in direct contact with each of the second lens unit 130 and the image sensor 182 in the optical axis LX.

At least one substrate, for example, the first connection substrate 141 and the second connection substrate 144 serves to supply a voltage to the liquid lens 142. To this end, the plurality of first electrodes E1 may be electrically connected to the first connection substrate 141, and the second electrode E2 may be electrically connected to the second connection substrate 144.

When a drive voltage is applied to the first and second electrodes E1 and E2 via the first connection substrate 141 and the second connection substrate 144, the interface BQ between the first liquid LQ1 and the second liquid LQ2 may be deformed so that at least one of the curvature or the focal length of the liquid lens 142 may be changed (or adjusted).

For example, the focal length of the liquid lens 142 may be adjusted as at least one of the curvature or the inclination of the interface BQ formed in the liquid lens 142 is changed to correspond to the drive voltage. When the deformation or the radius of curvature of the interface BQ is controlled, the liquid lens 142, the lens assembly 110, 120, 130, 140, 162A, 164A, 162B and 164B, the camera module 100A or 100B, and the optical device, which include the liquid lens 142, may perform an auto-focusing (AF) function, a handshaking absorbing function, an optical image stabilization (OIS) function, or the like.

The first connection substrate 141 may transmit four different drive voltages (hereinafter, "individual voltages") to the liquid lens 142, and the second connection substrate 144 may transmit one drive voltage (hereinafter, "common voltage") to the liquid lens 142. The common voltage may include a DC voltage or an AC voltage. When the common voltage is applied in a pulse form, the pulse width or the duty cycle may be constant. The individual voltages supplied via the first connection substrate 141 may be applied to the plurality of electrodes E1 (or the plurality of electrode sectors) exposed at the respective corners of the liquid lens 142.

Although not illustrated, when conductive epoxy is disposed between the first connection substrate 141 and the plurality of first electrodes E1, the first connection substrate 141 and the plurality of first electrodes E1 may be in contact with each other, may be coupled to each other, and may be in electrical conduction with each other. In addition, when conductive epoxy is disposed between the second connection substrate 144 and the second electrode E2, the second connection substrate 144 and the second electrode E2 may be in contact with each other, may be coupled to each other, and may be in electrical conduction with each other.

In addition, the first connection substrate 141 and the plurality of first electrodes E1 may be implemented as separate elements, or may be integrally formed. In addition, the second connection substrate 144 and the second electrode E2 may be implemented as separate elements, or may be integrally formed.

Figure 11:
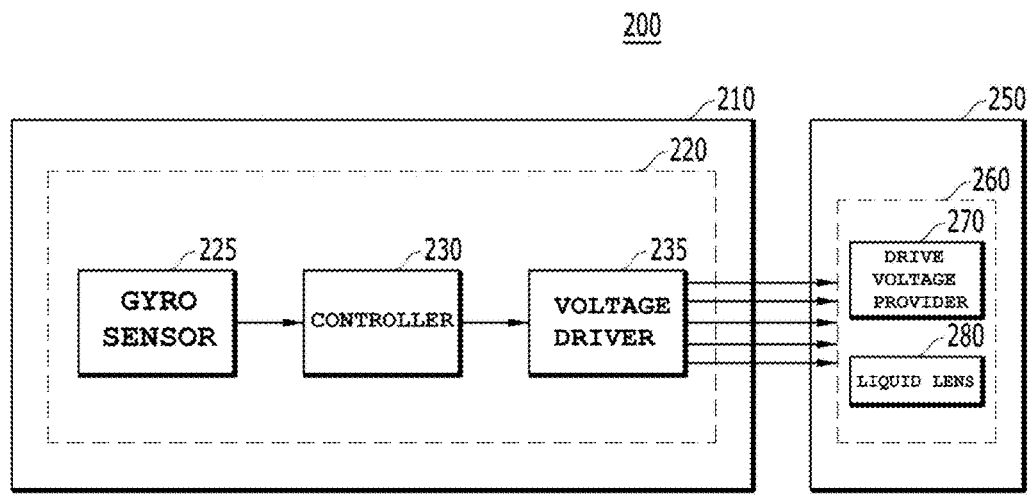
FIG. 11 is a schematic block diagram of the camera module.

FIG. 11 is a schematic block diagram of the camera module 200.

Referring to FIG. 11, the camera module 200 may include a control circuit 210 and a lens assembly 250. The control circuit 210 may correspond to the control circuit 24A or 24B illustrated in FIG. 1 or 6, and the lens assembly 250 may correspond to the lens assembly 22A or 22B illustrated in FIG. 1 or 6, the lens assembly 110, 120, 130, 140, 162A and 164A illustrated in FIG. 2, or the lens assembly 110, 120, 130, 140, 162B and 164B illustrated in FIG. 7.

The control circuit 210 may include a control unit 220, and may control the operation of the liquid lens unit 140 including the liquid lens 142.

The control unit 220 may have a configuration for performing an AF function and an OIS function, and may control a liquid lens 280 included in the lens assembly 250 using a user request or a sensed result (e.g. a movement signal of the gyro sensor 22A or 22B). Here, the liquid lens 280 may correspond to the above-described liquid lens 142.

In a certain embodiment, the control unit 220 may include a gyro sensor 225, a controller 230, and a voltage driver 235. In another embodiment, the gyro sensor 225 is an independent component that is not included in the control unit 220.

The gyro sensor 225 may sense the angular speed of a movement in two directions, including a yaw axis and a pitch axis, in order to compensate for handshaking in the horizontal and vertical directions of an optical device. The gyro sensor 225 may generate a movement signal corresponding to the sensed angular speed and provide the signal to the controller 230.

The controller 230 may remove a high frequency noise component from the movement signal using a low-pass filter (LPF) so as to extract only a desired frequency band for the implementation of an OIS function, may calculate the amount of handshaking using the movement signal from which the noise component has been removed, and may calculate a drive voltage corresponding to the shape that a liquid lens 280 of the liquid lens module 260 needs to have in order to compensate for the calculated amount of handshaking.

The controller 230 may receive information for an AF function (i.e. information on the distance to an object) from an internal component (e.g. an image sensor 182) or an external component (e.g. a distance sensor or an application processor) of the camera module 200 or the optical device, and may calculate the drive voltage corresponding to the desired shape of the liquid lens 280 based on a focal length, which is required to focus on the object, using the distance information.

The controller 230 may store a drive voltage table in which a drive voltage and a drive voltage code for making the voltage driver 235 generate the drive voltage are mapped, may acquire the drive voltage code corresponding to the calculated drive voltage by referring to the drive voltage table, and may output the acquired drive voltage code to the voltage driver 235.

The voltage driver 235 may generate a drive voltage in an analog form, which corresponds to the drive voltage code, based on a drive voltage code in a digital form provided from the controller 230, and may provide the drive voltage to the lens assembly 250.

The voltage driver 235 may include a voltage booster, which increases a voltage level upon receiving a supply voltage (e.g. a voltage supplied from a separate power supply circuit), a voltage stabilizer for stabilizing the output of the voltage booster, and a switching unit for selectively supplying the output of the voltage booster to each terminal of the liquid lens 280.

Here, the switching unit may include a circuit component called an H bridge. A high voltage output from the voltage booster is applied as a power supply voltage of the switching unit. The switching unit may selectively supply the applied power supply voltage and a ground voltage to opposite ends of the liquid lens 280. Here, the liquid lens 280 may include the four first electrodes E1 each including four electrode sectors, the first connection substrate 141, the second electrode E2, and the second connection substrate 144 for driving, as aforementioned. Opposite ends of the liquid lens 280 may mean the second electrode E2 and any one of the first electrodes E1. In addition, opposite ends of the liquid lens 280 may mean any one of the four electrode sectors of the four first electrodes E1 and one electrode sector of the second electrode E2.

A pulse-type voltage having a predetermined width may be applied to each electrode sector of the liquid lens 280, and the drive voltage applied to the liquid lens 280 is the difference between the voltages applied respectively to the first electrode E1 and the second electrode E2.

In addition, in order to allow the voltage driver 235 to control a drive voltage applied to the liquid lens 280 depending on a drive voltage code in a digital form provided from the controller 230, the voltage booster may control an increase in a voltage level, and the switching unit may control the phase of a pulse voltage applied to the common electrode and the individual electrode so as to generate a drive voltage in an analog form, which corresponds to the drive voltage code.

That is, the control unit 220 may control the voltage applied to each of the first electrodes E1 and the second electrode E2.

The control circuit 210 may further include a connector (not illustrated), which performs a communication or interface function of the control circuit 210. For example, the connector may perform communication protocol conversion for communication between the control circuit 210, which uses an inter-integrated circuit (I2C) communication method, and the lens assembly 250, which uses a mobile industry processor interface (MIPI) communication method. In addition, the connector may receive power from an external source (e.g. a battery), and may supply power required for the operation of the control unit 220 and the lens assembly 250. In this case, the connector may be the same as the connector 153 illustrated in FIG. 2 or 7.

The lens assembly 250 may include the liquid lens module 260, and the liquid lens module 260 may include a drive voltage provider 270 and the liquid lens 280.

The drive voltage provider 270 may receive a drive voltage from the voltage driver 235, and may provide the drive voltage to the liquid lens 280. Here, the drive voltage may be an analog voltage applied between one common electrode and any one individual electrode among "n" individual electrodes.

The drive voltage provider 270 may include a voltage adjustment circuit (not illustrated) or a noise removal circuit (not illustrated) for compensating for loss due to terminal connection between the control circuit 210 and the lens assembly 250, or may bypass the output voltage provided from the voltage driver 235 to the liquid lens 280.

The drive voltage provider 270 may be disposed on an FPCB (or a substrate), which constitutes at least a portion of the connection portion 152, but the embodiment is not limited thereto. The connection portion 152 may include the drive voltage provider 270.

The liquid lens 280 may be deformed in the interface BO thereof between the first liquid LQ1 and the second liquid LQ2 depending on a drive voltage, thereby performing at least one of an AF function or an OIS function.

Figure 12A:
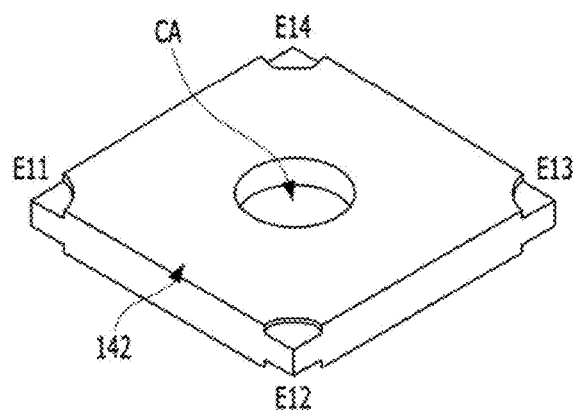
FIGS. 12(a) and 12(b) are views for explaining a liquid lens, the interface of which is adjusted to correspond to a drive voltage.
Figure 12B:
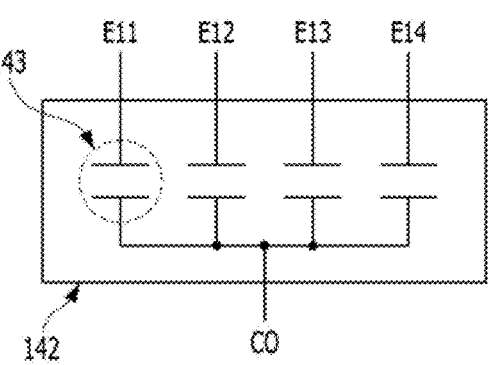

FIGS. 12(a) and 12(b) are views for explaining the liquid lens 142, the interface of which is adjusted to correspond to a drive voltage. Specifically, FIG. 12(a) illustrates a perspective view of the liquid lens 142 according to the embodiment, and FIG. 12(b) illustrates an equivalent circuit of the liquid lens 142. Here, the liquid lens 142 is the same as the liquid lens 142 of FIG. 2 or 7, and thus is designated by the same reference numeral.

First, referring to FIG. 12(a), the liquid lens 142, the shape of the interface B0 of which is adjusted to correspond to a drive voltage, may receive the drive voltage via a plurality of electrode sectors E11, E12, E13 and E14 of the plurality of first electrodes E1, which are disposed in four different directions to have the same angular distance therebetween, and an electrode sector C0 of the second electrode E2. When the drive voltage is applied via any one of the plurality of electrode sectors E1, E12, E13 and E14 of the plurality of first electrodes E1 and the electrode sector C0 of the second electrode E2, the shape of the interface BO between the first liquid LQ1 and the second liquid LQ2, which are disposed in the cavity CA, may be deformed. The degree of deformation and the shape of the interface BO between the first liquid LQ1 and the second liquid LQ2 may be controlled by the controller 230 in order to implement at least one of an AF function or an OIS function.

In addition, referring to FIG. 12(b), the liquid lens 142 may be described as a plurality of capacitors 143, in which one side of the lens 142 receives a voltage from the different electrode sectors E11, E12, E13 and E14 of the first electrodes E1, and the other side of the lens 142 is connected to the electrode sector C0 of the second electrode E2 so as to receive a voltage therefrom.

In FIG. 12(a), the number of different electrode sectors E11, E12, E13 and E14 included in the plurality of first electrodes E1 has been described as being four in this specification by way of example, but the embodiment is not limited thereto.

In the lens assembly according to the above-described embodiment, since the first and second adhesive members 162A and 164A are respectively disposed in the empty space between the holder 120 and the liquid lens unit 140 in the first and second openings OP1 and OP2, or the first and third adhesive portions 162B-1 and 164B-1 couple the holder 120 and the fourth and fifth areas A4 and A5 of the liquid lens unit 140, the liquid lens unit 140 may be firmly fixed to the holder 120.

In addition, in the camera module 100A or 100B including the lens assembly according to the above-described embodiments, once the first and second adhesive members 162A and 164A (or the fourth and fifth adhesive members 162B and 164B) have been disposed, the third adhesive member 166 is disposed in the space SP between the first cover 170 and the upper surface of the holder 120 so as to seal the inner space of the holder 120. Therefore, the liquid lens unit 140 disposed in the sealed inner space of the holder 120 may be protected from foreign substances such as dust or moisture from the outside. That is, although the optical performance of the camera module may be deteriorated or a defective proportion may increase when the foreign substances are introduced into the liquid lens unit 140, which is disposed in the inner space of the holder 120, the camera modules 100A and 100B according to the embodiments may inhibit this from occurring.

In addition, since the optical layer 190 or 190A to 190I is disposed in a film form or in a coated form as in the camera module 100A according to the above-described embodiment, it is not necessary to dispose a separate infrared light or ultraviolet light blocking filter and a sensor base between the second lens unit 130 or 130A and the image sensor 182. Thus, the possibility of the occurrence of a ghost or flare phenomenon due to inner total reflection, which occurs well in the plane close to the infrared light or ultraviolet light blocking filter and the sensor base, may be reduced, and the thickness of the camera module 100A may be reduced. For example, when the sum of the thicknesses of the infrared light or ultraviolet light blocking filter and the sensor base in the direction of the optical axis LX (e.g. the z-axis direction) is 0.46 mm, the thickness of the entire camera module 100A according to the embodiment may be reduced by 0.46 mm, which is the sum of the thicknesses of the filter and the sensor base.

In addition, since the optical layer 190 or 190A to 190I is formed in a coated form or in a film form instead of the filter and the sensor base, the camera module may achieve reduced manufacturing costs and economical competitiveness, compared to the camera module 100B, which includes the infrared light or ultraviolet light blocking filter or the sensor base. That is, the method of manufacturing the camera module 100B requires a process of bonding the filter 176 to the sensor base 178 and a process of bonding the sensor base 178 to the main board 150, whereas the method of manufacturing the camera module 100A does not require these bonding processes. Thus, the manufacturing costs may be reduced and the manufacturing time may be reduced.

Although some embodiments have been described above, various other embodiments are possible. These embodiments may be combined in various forms so long as the technical ideas of the embodiments are not incompatible, and thus new embodiments may be realized therefrom.

Meanwhile, an optical device may be implemented using the camera module 100A or 100B, which includes the lens assembly described above according to the embodiments. Here, the optical device may include a device that may process or analyze optical signals. Examples of the optical device may include camera/video devices, telescopic devices, microscopic devices, an interferometer, a photometer, a polarimeter, a spectrometer, a reflectometer, an autocollimator, and a lens-meter, and the embodiments may be applied to optical devices that may include the lens assembly.

In addition, the optical device may be implemented in a portable device such as a smart phone, a laptop computer, or a tablet computer. Such an optical device may include the camera module 100A or 100B, a display unit (not illustrated) for outputting the image, a battery (not illustrated) configured to supply power to the camera module 100A or 100B, and a main body housing in which the camera module 100A or 100B, the display unit, and the battery are mounted. The optical device may further include a communication module, which may communicate with other devices, and a memory unit, which may store data therein. The communication module and the memory unit may also be mounted in the main body housing.

It should be apparent to those of ordinary skill in the art that the disclosure may be embodied into other particular forms within a range not deviating from the scope and essential features of the disclosure. Thus, the above detailed description should not be construed as being limitative in all terms, but should be considered as being illustrative. The scope of the disclosure should be determined by the rational analysis of the accompanying claims, and all changes within the equivalent range of the disclosure are included in the scope of the disclosure.

MODE FOR INVENTION

As described above, a related description has sufficiently been discussed in the above "Best Mode" for implementation of the embodiments.

INDUSTRIAL APPLICABILITY

A lens assembly and a camera module including the lens assembly according to the embodiments may be may be used in camera/video devices, telescopic devices, microscopic devices, an interferometer, a photometer, a polarimeter, a spectrometer, a reflectometer, an auto-collimator, a lens-meter, a smart phone, a laptop computer, or a tablet computer.

What is claimed is:

1. A lens assembly, comprising:
a holder comprising a first sidewall having a first opening and a second sidewall having a second opening;
a liquid lens unit comprising at least a portion disposed in the first opening and the second opening; and
an adhesive member coupling the holder and the liquid lens unit,
wherein the second opening faces the first opening in a first direction perpendicular to an optical axis of the liquid lens unit,
wherein the liquid lens unit comprises a first area disposed outside of the first opening of the holder, and
wherein the adhesive member is coupled to the first area of the liquid lens unit.

2. The lens assembly according to claim 1, wherein the holder further comprises:
a holder upper area disposed above the liquid lens unit; and
a holder lower area disposed below the liquid lens unit.

3. The lens assembly according to claim 1, wherein the adhesive member seals the holder to inhibit a foreign substance from being introduced inside the holder through the first opening from an outside.

4. The lens assembly according to claim 2, wherein the adhesive member comprises:
a first adhesive coupling the holder upper area and the liquid lens unit; and
a second adhesive coupling the holder lower area and the liquid lens unit.

5. The lens assembly according to claim 1, wherein the liquid lens unit further comprises:
a second area disposed outside of the second opening of the holder, and
wherein the adhesive member comprises:
a first adhesive disposed in the first area of the liquid lens unit and disposed on an upper portion of the liquid lens unit;
a second adhesive disposed in the first area of the liquid lens unit and disposed on a lower portion and a side portion of the liquid lens unit;
a third adhesive disposed in the second area of the liquid lens unit and disposed on the upper portion of the liquid lens unit; and
a fourth adhesive disposed in the second area of the liquid lens unit and disposed on the lower portion and the side portion of the liquid lens unit.

6. The lens assembly according to claim 1, wherein the liquid lens unit comprises:
a liquid lens; and
a spacer disposed surrounding a lateral surface of the liquid lens.

7. The lens assembly according to claim 6, wherein the liquid lens unit further comprises:
a first connection substrate disposed above the liquid lens; and
a second connection substrate disposed below the liquid lens,
wherein the spacer is disposed between the first connection substrate and the second connection substrate.

8. The lens assembly according to claim 6, wherein at least a portion of the spacer is disposed in the first opening and the second opening.

9. The lens assembly according to claim 8, wherein the spacer protrudes outward from the holder through the first opening and the second opening.

10. The lens assembly according to claim 6, wherein the liquid lens comprises at least a portion disposed in the first opening and the second opening.

11. A lens assembly, comprising:
a holder comprising a first opening and a second opening;
a liquid lens unit comprising a portion protruding outside of the holder through at least one of the first opening and the second opening; and an adhesive member coupling the holder and the liquid lens unit, wherein the adhesive member comprises: a first adhesive coupling the holder and an upper surface of the liquid lens unit; and a second adhesive coupling the holder and a lower surface and a side surface of the liquid lens unit, and wherein the second opening faces the first opening in a first direction perpendicular to an optical axis of the liquid lens unit.

12. The lens assembly according to claim 11, wherein the first adhesive has an I-shaped form, and the second adhesive has a U-shaped form.

13. The lens assembly according to claim 11, wherein the first adhesive has a maximum diameter smaller than a maximum diameter of the second adhesive.

14. The lens assembly according to claim 11, wherein the second adhesive is connected to the first adhesive.

15. The lens assembly according to claim 11, wherein the second adhesive has a contraction rate smaller than a contraction rate of the first adhesive.

16. The lens assembly according to claim 15, wherein the second adhesive comprises an adhesive having a contraction rate equal to or less than 1% upon curing.

17. The lens assembly according to claim 11, wherein the second adhesive comprises a silicon-based adhesive.

18. A lens assembly, comprising:
a holder comprising a first opening and a second opening;
a liquid lens unit disposed between the first opening and the second opening and protruding outside of the first opening of the holder;
a first adhesive fixing the liquid lens unit to the holder; and
a second adhesive hermetically sealing the first opening, wherein the first adhesive and the second adhesive are formed of different materials, and wherein the second opening faces the first opening in a first direction perpendicular to an optical axis of the liquid lens unit.

19. A camera module, comprising:
a board;
a holder disposed on the board;
a first lens unit disposed in the holder;
a second lens unit disposed in the holder;
a liquid lens unit disposed between the first lens unit and the second lens unit; and
an adhesive member coupling the holder and the liquid lens unit, wherein the holder comprises a first sidewall having a first opening and a second sidewall having a second opening, wherein at least a portion of the liquid lens unit is disposed in the first opening and the second opening, wherein the liquid lens unit comprises a first area disposed outside of the first opening of the holder, wherein the second opening faces the first opening in a first direction perpendicular to an optical axis of the liquid lens unit, and wherein the adhesive member is coupled to the first area of the liquid lens unit.

20. The camera module according to claim 19, further comprising a cover disposed so as to surround the holder, the liquid lens unit, and the adhesive member, wherein the holder comprises an upper surface in direct physical contact with the cover and located higher than an upper surface of the adhesive member.

* * * * *